US012641148B1

(12) United States Patent
Dey et al.

(10) Patent No.: US 12,641,148 B1
(45) Date of Patent: May 26, 2026

(54) CLOUD AGNOSTIC MEDIA MANAGER AND USE OF SAME

(71) Applicant: AMERICAN AIRLINES, INC., Fort Worth, TX (US)

(72) Inventors: Arnab Dey, Chandler, AZ (US); Joe Shaffer, Dallas, TX (US); Theodore M Tigno, Jr., Phoenix, AZ (US); John D. Andersen, Phoenix, AZ (US); Clifford Scott Dunn, Dallas, TX (US); Machele Lugo, Chandler, AZ (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 110 days.

(21) Appl. No.: 18/807,352

(22) Filed: Aug. 16, 2024

Related U.S. Application Data

(60) Provisional application No. 63/520,076, filed on Aug. 16, 2023, provisional application No. 63/520,071, filed on Aug. 16, 2023.

(51) Int. Cl.
| | |
|---|---|
| *H04L 67/1095* | (2022.01) |
| *G06F 16/27* | (2019.01) |
| *H04L 43/08* | (2022.01) |
| *H04L 43/20* | (2022.01) |
| *H04L 67/02* | (2022.01) |
| *H04L 67/1097* | (2022.01) |
| *G06F 16/23* | (2019.01) |
| *H04L 69/40* | (2022.01) |

(52) U.S. Cl.
CPC .......... *H04L 67/1095* (2013.01); *G06F 16/27* (2019.01); *G06F 16/273* (2019.01); *H04L 43/08* (2013.01); *H04L 43/20* (2022.05);

*H04L 67/02* (2013.01); *H04L 67/1097* (2013.01); *G06F 16/2365* (2019.01); *G06F 16/275* (2019.01); *H04L 69/40* (2013.01)

(58) Field of Classification Search
None
See application file for complete search history.

(56) References Cited

U.S. PATENT DOCUMENTS

| | | | | |
|---|---|---|---|---|
| 10,372,515 | B1 * | 8/2019 | Stripe | B64F 5/60 |
| 10,684,994 | B2 * | 6/2020 | Ngan | G06F 11/1471 |
| 11,330,055 | B2 * | 5/2022 | Trachy | G06F 11/1464 |

(Continued)

*Primary Examiner* — Lashonda Jacobs-Burton
(74) *Attorney, Agent, or Firm* — HAYNES AND BOONE, LLP

(57) ABSTRACT

A system and method of interacting with cloud systems using a first cloud system ("FCS") and an application programming interface ("API") that interacts with a second and third cloud system, the method comprising: receiving, by the API, a user instruction associated with a file; accessing, in a database of the FCS, metadata for the file to identify a storage setting of the file; accessing, by the processor and when the storage setting is an infrequent identifier, an infrequent storage of the FCS; accessing, by the processor and when the storage setting is a frequent identifier, the frequent storage of the FCS; monitoring, by the processor, a change to the media in the FCS; and implementing, by the processor, the change to the media in the second and third cloud systems thereby syncing and performing real-time reconciliation across the first, second, and third could systems.

22 Claims, 26 Drawing Sheets

(56)        References Cited

U.S. PATENT DOCUMENTS

| | | | |
|---|---|---|---|
| 2003/0084361 A1* | 5/2003 | Lawrence | G06F 16/273 |
| | | | 713/400 |
| 2012/0246226 A1* | 9/2012 | Anandam | H04L 67/06 |
| | | | 709/203 |
| 2015/0012488 A1* | 1/2015 | van Rossum | G06F 16/1767 |
| | | | 707/611 |
| 2015/0101021 A1* | 4/2015 | Mc Erlean | G06F 8/61 |
| | | | 707/625 |
| 2015/0261514 A1* | 9/2015 | Fu | G06F 8/63 |
| | | | 718/1 |
| 2016/0248753 A1* | 8/2016 | Dictos | G06F 8/65 |
| 2016/0248839 A1* | 8/2016 | Quintero | H04L 67/1097 |
| 2016/0371286 A1* | 12/2016 | Danovitz | G06F 16/483 |
| 2017/0116206 A1* | 4/2017 | Gumerato | G06F 16/275 |
| 2017/0235808 A1* | 8/2017 | Salame | H04L 67/1095 |
| | | | 707/625 |
| 2020/0242078 A1* | 7/2020 | Dain | G06F 16/906 |
| 2021/0279227 A1* | 9/2021 | Peercy | G06F 16/289 |
| 2022/0012265 A1* | 1/2022 | Salame | H04L 67/10 |
| 2022/0300459 A1* | 9/2022 | Boshev | G06F 16/275 |
| 2024/0106710 A1* | 3/2024 | Lian | H04L 67/1396 |
| 2024/0275863 A1* | 8/2024 | Rishniw | H04L 67/1097 |
| 2025/0130863 A1* | 4/2025 | Peev | G06F 9/5083 |

* cited by examiner

TO FIG. 15B

Aircraft Near ETR (within 24 hrs) (32) Download

| AC STN | AOS (DFW) | Rea | ETR (DFW) | Description |
|---|---|---|---|---|
| 925 CLT | 1205/14Aug (1105/14Aug) | T | 1500/14Aug (1400/14Aug) | S P0 MEL 31-04A DFDR FAULT |
| 879 DFW | 1218/14Aug (1218/14Aug) | U | 1430/14Aug (1430/14Aug) | P L ENG HPV FAULT |
| 3ND DFW | 1627/13Aug (1627/13Aug) | U | 1500/14Aug (1500/14Aug) | M FO PITOT CRRSN / ACFT W/N COOL C/W |

Recent Reason Code Updates (past 48 hrs) (4) Download

| AC STN | AOS (DFW) | Rea | ETR (DFW) | Description |
|---|---|---|---|---|
| 8AG MIA | 1319/14Aug (1219/14Aug) | S | 2300/14Aug (2200/14Aug) | 1340/14Aug - Reason Code was updated from U to S |
| 925 CLT | 1205/14Aug (1105/14Aug) | T | 1500/14Aug (1400/14Aug) | 1210/14Aug - Reason Code was updated from U to T |
| 816 PTO | 1952/13Aug (1852/13Aug) | U | D 2300/17Aug (2200/17Aug) | 0813/14Aug - Reason Code was updated from B to U |

Recent ETR Changes (past 24 hrs) (45) Download

| AC STN | AOS (DFW) | Rea | ETR (DFW) / Prior ETR | Description |
|---|---|---|---|---|
| 032 CLT | 0347/14Aug (0247/14Aug) | U | 1900/14Aug (1800/14Aug) 1500/14Aug Bumps: 2 | S P0 MON R ENG VSV FAULT |
| 151 BUF | 1044/14Aug (0944/14Aug) | U | D 0500/15Aug (0400/15Aug) D 1330/14Aug Bumps: 1 | S MEL 36-01B R ENG BLD FAULT - WX RESTR |
| 170 DFW | 1531/13Aug (1531/13Aug) | U | 0400/15Aug (0400/15Aug) D 2300/14Aug Bumps: 3 | M L WNG AIR LK MSG |

FROM FIG. 15A

1600

1900

AOS        Times should be local time for station of the aircraft.

GMT: 1735    18     JUL     24

| AC* | STA* | AOS TIME* | DAY* | MON* | YR* | ATA* |
|-----|------|-----------|------|------|-----|------|
| 002 | DFW | 1235 | 18 | JUL ▾ | 24 | 3210 |

ⓘ

| | ETR TIME* | DAY* | MON* | YR* | LOCATION |
|--|-----------|------|------|-----|----------|
| ETR   Decision | 1600| | 18 | JUL ▾ | 24 | Terminal ▾ |

OPS EVENT*

| REA (U)* ▾ | ⓘ | N/A ▾ | AOS Driver (P)* ▾ | ⓘ |

1905

| 12/18 | 13 | 14 | 15 | 16 | 17 | 18 | 19 | 20 | 21 | 22 |
|-------|----|----|----|----|----|----|----|----|----|----|
| ▮▾ | ▮▾ | ▮▾ | ▮▾ | ▮▾ | ▮▾ | ▮▾ | ▮▾ | ▮▾ | ▮▾ | ▮▾ |

TS (D) 1235/18Jul  ↔  IW 1600/18Jul     ↔

Timeline and ETR in sync.

DESCRIPTION TEXT*     ⓘ ⓘ

INITIAL COMMENT

Initial Comment

Please enter alll the required * fields.    [ SUBMIT ]   Cancel

FIG. 19

CLOUD AGNOSTIC MEDIA MANAGER AND USE OF SAME

CROSS-REFERENCE TO RELATED APPLICATIONS

This application claims the benefit of the filing date of, and priority to, U.S. Application No. 63/520,076, filed Aug. 16, 2023, the entire disclosure of which is hereby incorporated herein by reference.

This application claims the benefit of the filing date of, and priority to, U.S. Application No. 63/520,071, filed Aug. 16, 2023, the entire disclosure of which is hereby incorporated herein by reference.

This application is related to U.S. patent application Ser. No. 18/807,424, filed Aug. 16, 2024, the entire disclosure of which is hereby incorporated herein by reference.

TECHNICAL FIELD

This disclosure relates in general to airline operations infrastructure associated with the management of out-of-service vehicles, such as aircraft. More specifically, this disclosure relates to software and related infrastructure that operate universally across various cloud platforms and that leverage different major cloud storage services as its back-end to manage media files.

BACKGROUND

Airlines rely on software and hardware, which form a portion of an airline's operations infrastructure, to monitor and control a variety of airline-related activities, such as for example the maintenance of aircraft. Due to the increased complexity associated with large airline networks, multiple fleets of aircraft, and the interconnection and downstream effects between aircraft readiness and schedules, the functionality of conventional software and hardware is reduced thereby limiting the operations of the airline.

A first type of conventional software that forms a portion of an airline's operations infrastructure relates to an application that tracks the location of aircraft, the physical status of aircraft, historical events associated with aircraft and current events associated with aircraft. Generally, this type of conventional software requires media, such as pictures, videos, and other documents, to be uploaded or stored for a specific period of time. The storage requirements associated with media for every aircraft in multiple fleets of aircraft can be extremely large and can reduce the ability to quickly and reliably access, modify, upload, and delete the media/data by team members.

A second type of software and hardware, which form a portion of an airline's operations infrastructure, relates to data storage for the media and other data associated with aircraft. Some conventional airline operational systems rely on cloud computing for data storage and application deployment. A plethora of cloud service providers exist, each offering distinct storage and computing capabilities. Consequently, users find themselves utilizing different cloud platforms and storage repositories, leading to data fragmentation and management complexities. Conventional solutions offer limited compatibility and interoperability, often restricting users to a particular cloud platform. Cross-platform migration of media files is a cumbersome process, necessitating manual efforts and specialized tools. Moreover, there are many technical problems associated with real-time synchronization of media files across multiple cloud storage repositories.

The present disclosure solves the technical problems associated with the conventional software and hardware that form a portion of an airline's operations infrastructure. For example, the disclosed system operates as a web-based platform using a cloud agnostic media manager. In some embodiments, the web-based platform improves the technical field of flight operations and aircraft management due to its seamless accessibility for authorized personnel across locations as well as permission levels. In some embodiments, the cloud agnostic media manager addresses the technical problems associated with existing systems by offering seamless compatibility with any cloud platform and supporting various major cloud storage services as its back-end for media file management. In some embodiments, the cloud agnostic media manager offers automated migration capabilities, thereby simplifying the process of moving media files from one cloud storage repository to another regardless of the underlying storage technology. Additionally, the cloud agnostic media manager provides an advanced reconciliation mechanism that enables real-time updates of media files across diverse cloud platform storage repositories. Through this mechanism, users can ensure consistency and synchronization of media files across different cloud environments. As such, each of the web-based platform and the cloud agnostic media manager provides a technical solution to a technical problem that improves the technical field of airline operation infrastructure and the technical field of flight operations and aircraft management.

BRIEF DESCRIPTION OF THE DRAWINGS

FIGS. 15A and 15B together are an illustration of a window displayed on user interfaces of the computers of FIG. 1, according to an exemplary embodiment.

FIGS. 16-21 are illustrations of windows displayed on user interfaces of the computers of FIG. 1, according to an exemplary embodiment.

DETAILED DESCRIPTION

Figure 1:
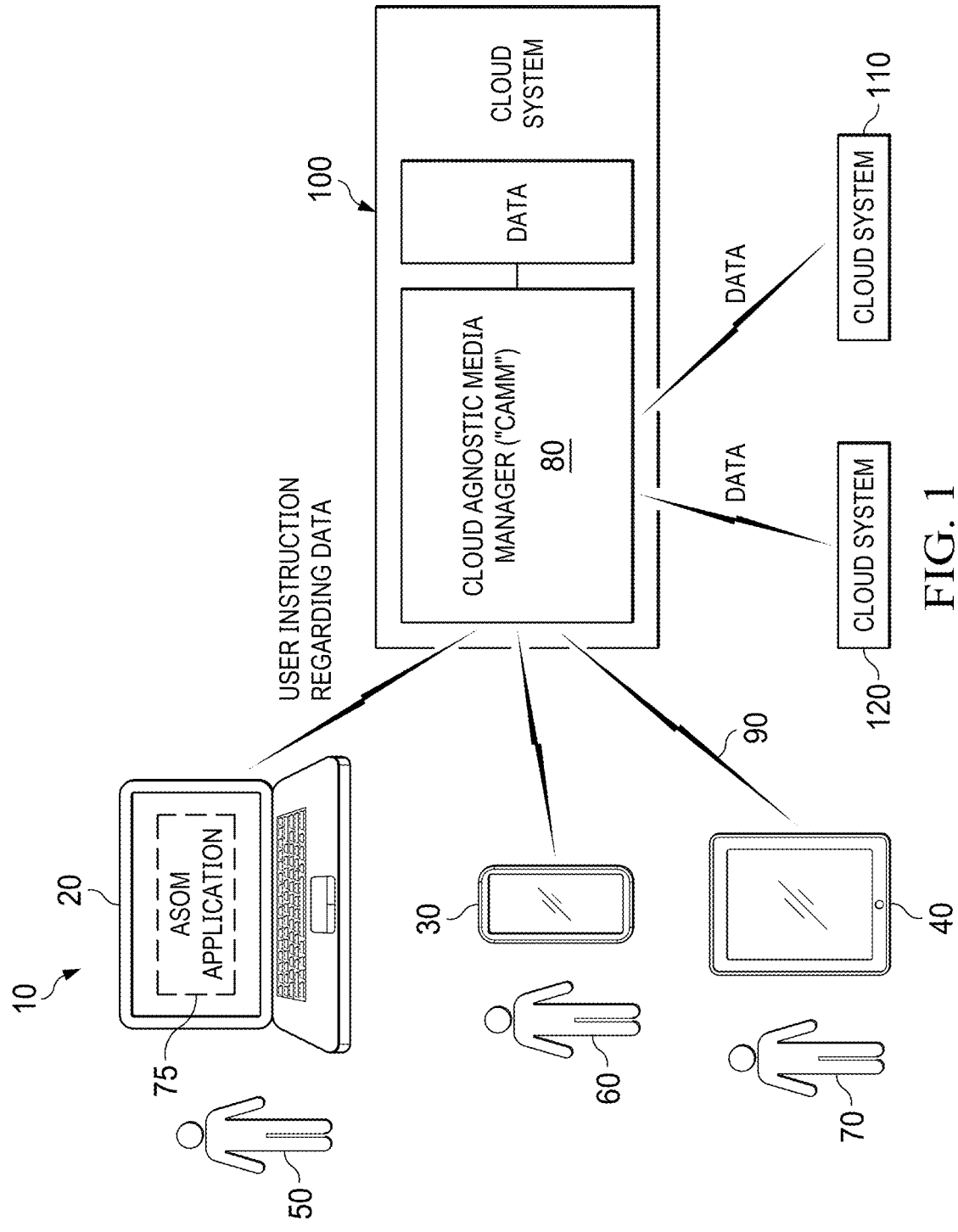
FIG. 1 is a diagrammatic illustration of a system including computers according to an example embodiment.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As noted above, there are many technical problems associated with conventional software and hardware that form a portion of an airline's operations infrastructure. For example, conventional software or applications that track the location of aircraft, the physical status of aircraft, historical events associated with aircraft, and current events associated with aircraft requires media, such as pictures, videos, and other documents, to be uploaded or stored for a specific period of time. The storage requirements associated with media for every aircraft in multiple fleets of aircraft can be extremely large and can reduce the ability to quickly and reliably access, modify, upload, and delete the media/data by team members. Additionally, some conventional airline operational systems rely on cloud computing for data storage and application deployment. A plethora of cloud service providers exist, each offering distinct storage and computing capabilities. Consequently, users find themselves utilizing different cloud platforms and storage repositories, leading to data fragmentation and management complexities. Conventional solutions offer limited compatibility and interoperability, often restricting users to a particular cloud platform. Cross-platform migration of media files is a cumbersome process, necessitating manual efforts and specialized tools. Moreover, there are many technical problems associated with real-time synchronization of media files across multiple cloud storage repositories.

The present disclosure solves the technical problems associated with the conventional software and hardware that form a portion of an airline's operations infrastructure. For example, the disclosed system operates as a web-based platform using a cloud agnostic media manager. In some embodiments, the web-based platform improves the technical field of flight operations and aircraft management due to its seamless accessibility for authorized personnel across locations as well as permission levels. In some embodiments, the cloud agnostic media manager addresses the technical problems associated with existing systems by offering seamless compatibility with any cloud platform and supporting various major cloud storage services as its backend for media file management. In some embodiments, the cloud agnostic media manager offers automated migration capabilities, thereby simplifying the process of moving media files from one cloud storage repository to another regardless of the underlying storage technology. Additionally, the cloud agnostic media manager provides an advanced reconciliation mechanism that enables real-time updates of media files across diverse cloud platform storage repositories. Through this mechanism, users can ensure consistency and synchronization of media files across different cloud environments. As such, each of the web-based platform and the cloud agnostic media manager provides a technical solution to a technical problem that improves the technical field of airline operation infrastructure and the technical field of flight operations and aircraft management.

In an example embodiment, as illustrated in FIG. 1, a system is generally referred to by the reference numeral 10 and includes computers 20, 30, and 40, with each computer configured for use by users 50, 60, and 70, respectively. In some embodiments, a portion of the users 50, 60, and 70 has management permissions and another portion does not have management permissions. In some embodiments, the system 10 also includes a computer application, such as a ASOM application 75 that is capable of displaying windows on a user interface of each of the computers 20, 30, and 40. In one embodiment, the ASOM application 75 is in communication with a cloud agnostic media manager ("CAMM") 80 via a network 90. The CAMM 80 communicates with and/or forms a portion of a cloud system 100. In some embodiments, the CAMM 80 communicates with a cloud system 110 and a cloud system 120 via the network 90. Using the ASOM application 75, any one of the users 50, 60, and 70 may send instructions to the CAMM 80 to interact with the cloud systems 100, 110, and 120.

Figure 2:
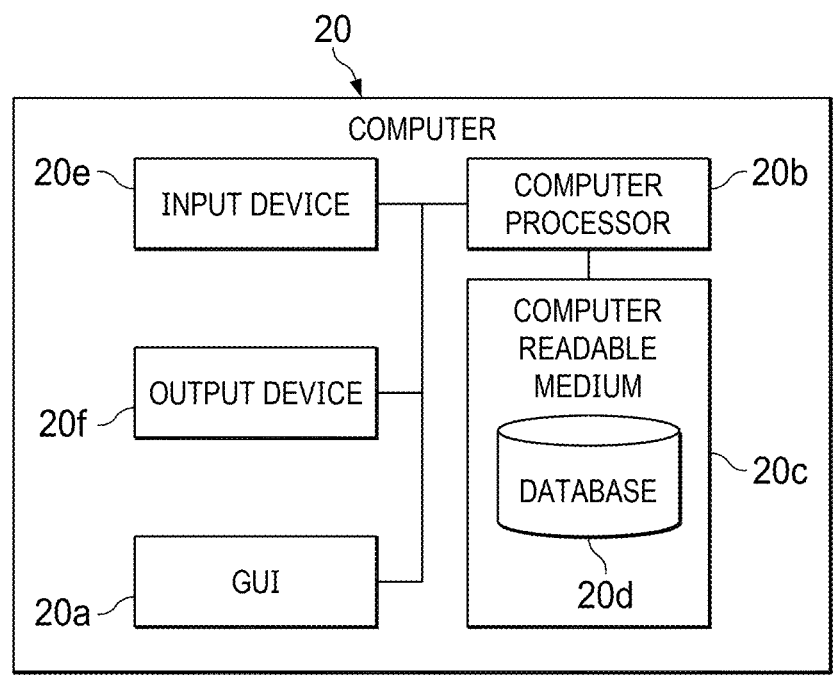
FIG. 2 is a diagrammatic illustration of the computer of FIG. 1, according to an exemplary embodiment.

In an example embodiment, as illustrated in FIG. 2 with continuing reference to FIG. 1, the computer 20 includes a GUI 20a, computer processor 20b and a computer readable medium 20c operably coupled thereto. Instructions accessible to, and executable by, the computer processor 20b are stored on the computer readable medium 20c. A database 20d is also stored in the computer readable medium 20c. Generally, the GUI 20a can display a plurality of windows or screens to the user. The computer 20 also includes an input device 20e and an output device 20f. In some embodiments, the input device 20e and the output device 20f are the GUI 20a. In some embodiments, the user provides inputs to the system 10 via a window such as a window that is displayed on the GUI 20a. However, the input device 20e can also be a microphone in some embodiments and the output device 20f is a speaker. In several example embodiments, the computer 20 is, or includes, a telephone, a personal computer, a personal digital assistant, a cellular telephone or mobile phone, other types of telecommunication devices, other types of computing devices, and/or any combination thereof. In some embodiments, the computers 30 and 40 are similar or nearly identical to the computer 20 in that each includes a GUI, a computer processor, a computer readable medium, a database, an input device, and an output device.

Figure 3:
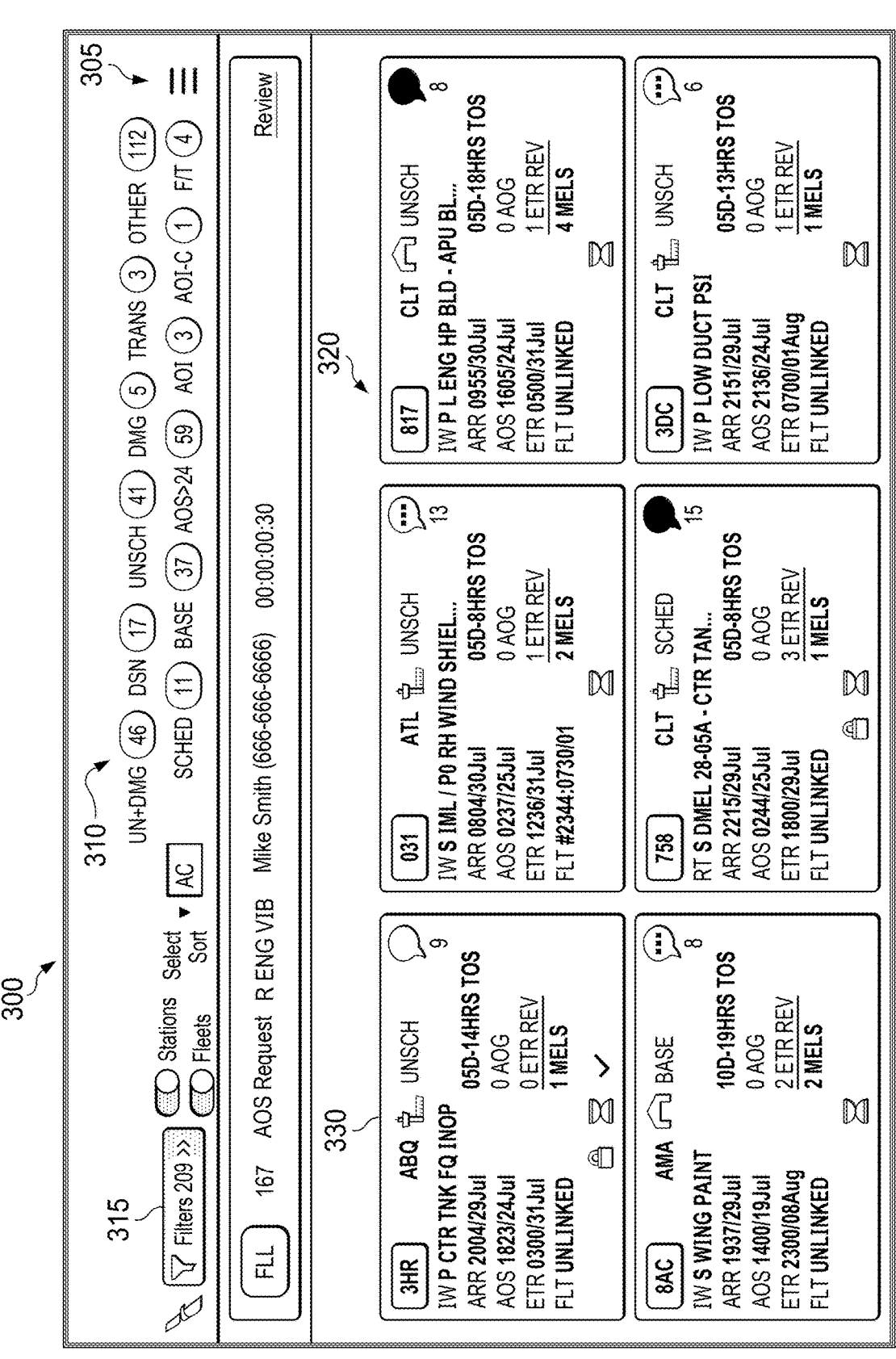
FIGS. 3-14 are illustrations of windows displayed on user interfaces of the computers of FIG. 1, according to an exemplary embodiment.

In some embodiments, the ASOM application 75 is configured to display a plurality of windows, on for example the computers 20, 30, and 40. In some embodiments, the ASOM application 75 tracks the status of out of service vehicle, such as an aircraft. Vehicles are capable of being located at one of many stations and the maintenance crew, capacity, and capabilities vary among the stations. As such, managing the status of out of service vehicles is a complex technical field that requires specific software. An example window 300 that is displayed by the ASOM application 75 is illustrated in FIG. 3. As illustrated, the window 300 includes a hamburger icon 305, quick-see menus 310 associated with commonly used filters and sorting shortcuts, a filter drawer 315, and a tile viewing area 320 that displays a plurality of tiles including a tile 330. While a hamburger icon is illustrated in FIG. 3, any type of menu icon can be used in place of a hamburger icon. FIG. 3 is an example of an overview display when the ASOM application 75 is in "Tile" view. In some embodiments, each tile in the plurality of tiles contains a plurality data points, such as twenty-two, for analysis. In some embodiments, each tile is associated with an aircraft. In some embodiments, the quick-see menus 310 include filters associated with stations and are grouped by area or jurisdiction, filters associated with fleets and are grouped by domestic, flagship, Airbus, and Boeing, and other filters such as "Stn Roll Call", "Station", "Time Till ETR", "Nose Nbr", "0300 Call", "0400 Call", "0500 Call", "Duration", and "Departure."

Figure 4:
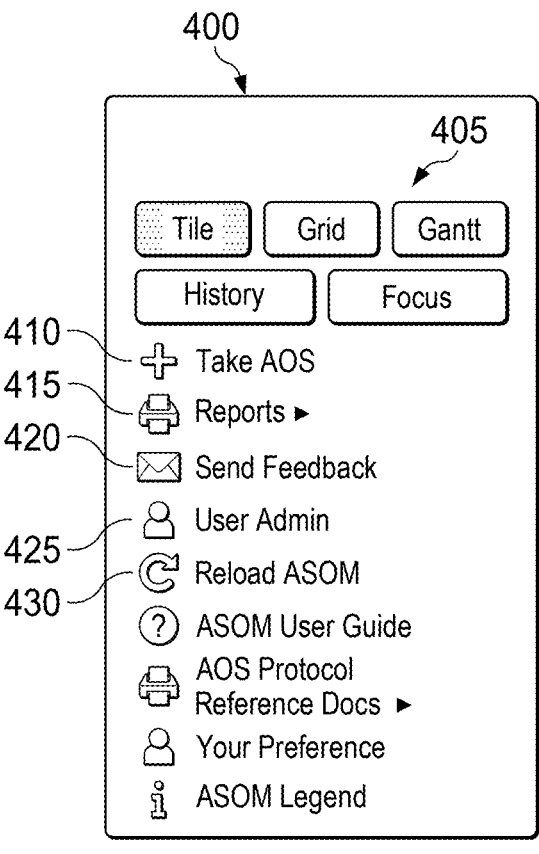

FIG. 4 is an example illustration of the drop-down menu 400 that is accessible when the hamburger menu 305 is selected. As illustrated, the menu 400 comprises a number, such as five, selectable tabs 405 associated with different user interfaces. In some embodiments, the selectable tabs 405 include a "Tile" view, which is illustrated in FIG. 3, a "Grid" view, a "Gantt" view, a "History" view, and a "Focus" view. In some embodiments, the drop-down menu 400 also includes a selectable "Take AOS" element 410 that used to create a request to take an aircraft Out of Service ("AOS"), a selectable "Reports" element 415 that links to various documents for business reference, a selectable "Send Feedback" element 420, a selectable "User Admin" element 425 that allows for entry of credentials associated with specific work force permissions from a drop-down menu, and a selectable "Reload ASOM" element 430, among other selectable elements. Generally, a user requests permission from the "User Admin" drop-down menu 425 and then selects the "Reload ASOM" element 430 to refresh the ASOM application 75 to reflect the new permission access. In some embodiments, update functions are permission controlled with certain individuals granted the ability to request and change an estimated time remaining ("ETR"), Request an AOS, or Request a return to service ("RTS"). In some embodiments, maintenance operational control ("MOC") and/or planning is granted the ability to review and action these requests. In some embodiments, each station has the ability via the ASOM application 75 to communicate a request for an AOS, a request a change to an ETR, and a request an RTS to MOC and/or planning.

Figure 5:
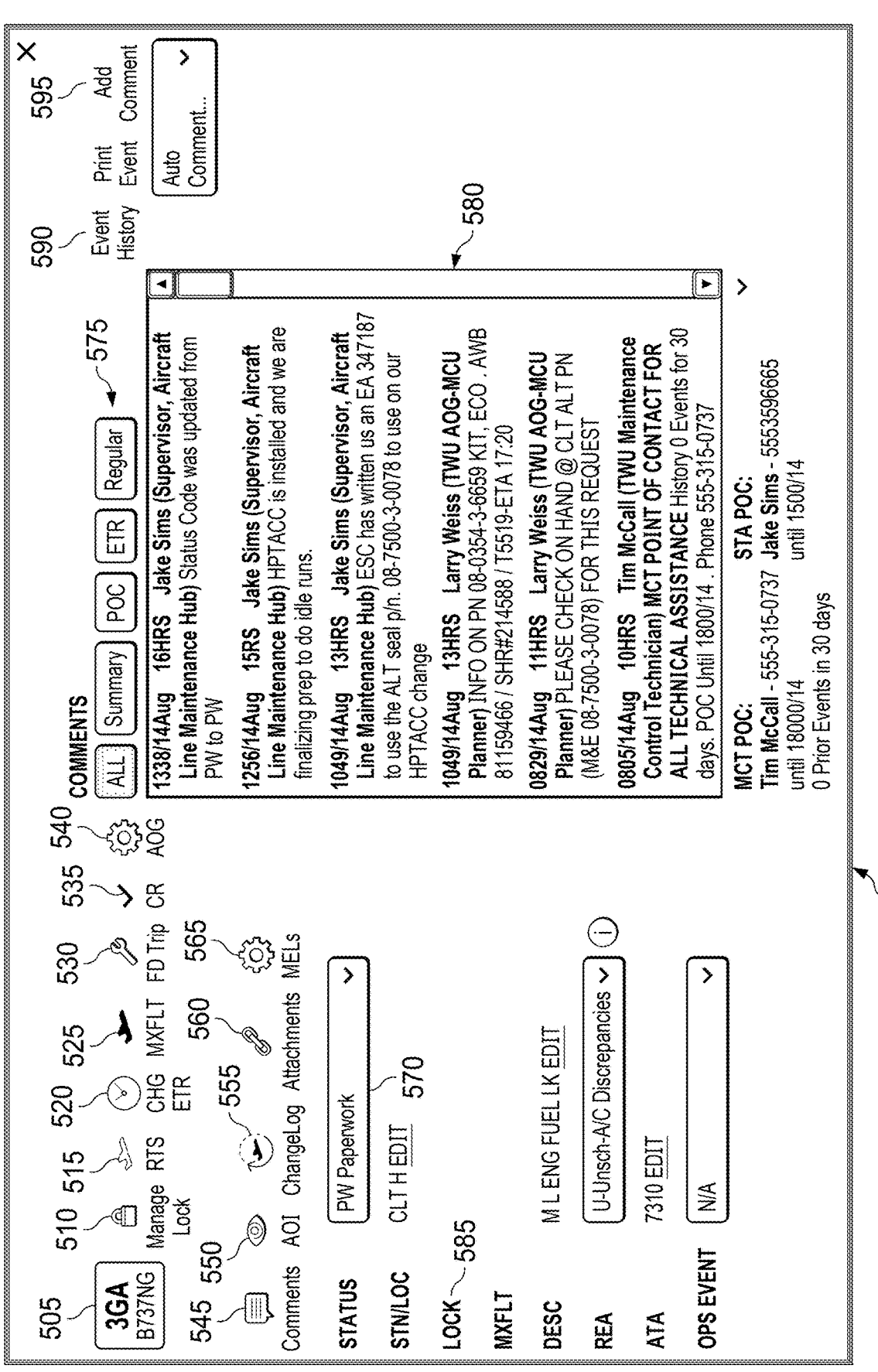

FIG. 5 is an example window 500 that is displaying "Event Details" for a tile from the plurality of tiles. In some embodiments, the window 500 is displayed after one of the tiles from the plurality of tiles is selected via the window 300. In some embodiments, the event details include an aircraft identification number 505, such as 3GA, and includes selectable elements such as a manage lock icon/text 510, a RTS icon/text 515, a CHG ETR icon/text 520, a MXFLT icon/text 525, a FD Trip icon/text 530, a CR icon/text 535, an AOG icon/text 540, a Comments icon/text 545, an AOI icon/text 550, a ChangeLog icon/text 555, an Attachments icon/text 560, and MELs icon/text 565. The window 500 also includes a drop-down menu 570 for a status of the tile/aircraft and a plurality of filters 575 to apply to a listing of comments 580, including comments from MCT, STA, and Management. The window 500 also includes a LOCK status 585 and selectable elements for event history 590, print event, and add comment 595. In some embodiments, the event details are associated with the status of the selected aircraft.

In some embodiments, the aircraft identification number 505 is positioned over a background color. In some embodiments, a purple color is associated with the aircraft associated with the tile being retired, an orange color is associated with the aircraft being stored, a blue color is associated with the aircraft being parked, a green color is associated with the aircraft proceeding as expected, a yellow color is associated with the aircraft being less than two hours before flight, a red color is associated with the aircraft not having an ETR, and a brown color is associated with the BASE. In some embodiments, the ASOM application 75 uses color indicators in other areas, such as for example to denote the freshness of a comment (e.g., a blue comment bubble indicate that a comment was made within 1 hour and a black comment bubble indicates that a comment has been made between 1 hour and 2 hours).

In some embodiments, the manage lock icon/text 510 selectable element opens a window that is associated with a LOCK request for the aircraft associated with that tile. In some embodiments, the window associated with the LOCK request is configured to receive an optional comment regarding the locking of the aircraft and a selectable "LOCK AC" button. A similar window is displayed when the aircraft is unlocked.

In some embodiments, the RTS icon/text 515 selectable element opens a window that is associated with a Return to Service request associated with the aircraft and is configured to receive an updated day, date, and/or time; a comment; a status; and STN POC. In some embodiments, a return to service request is unique to a station and will be rejected if a concurrence is required and/or if a LOCK has been posted to the selected aircraft.

Figure 6:
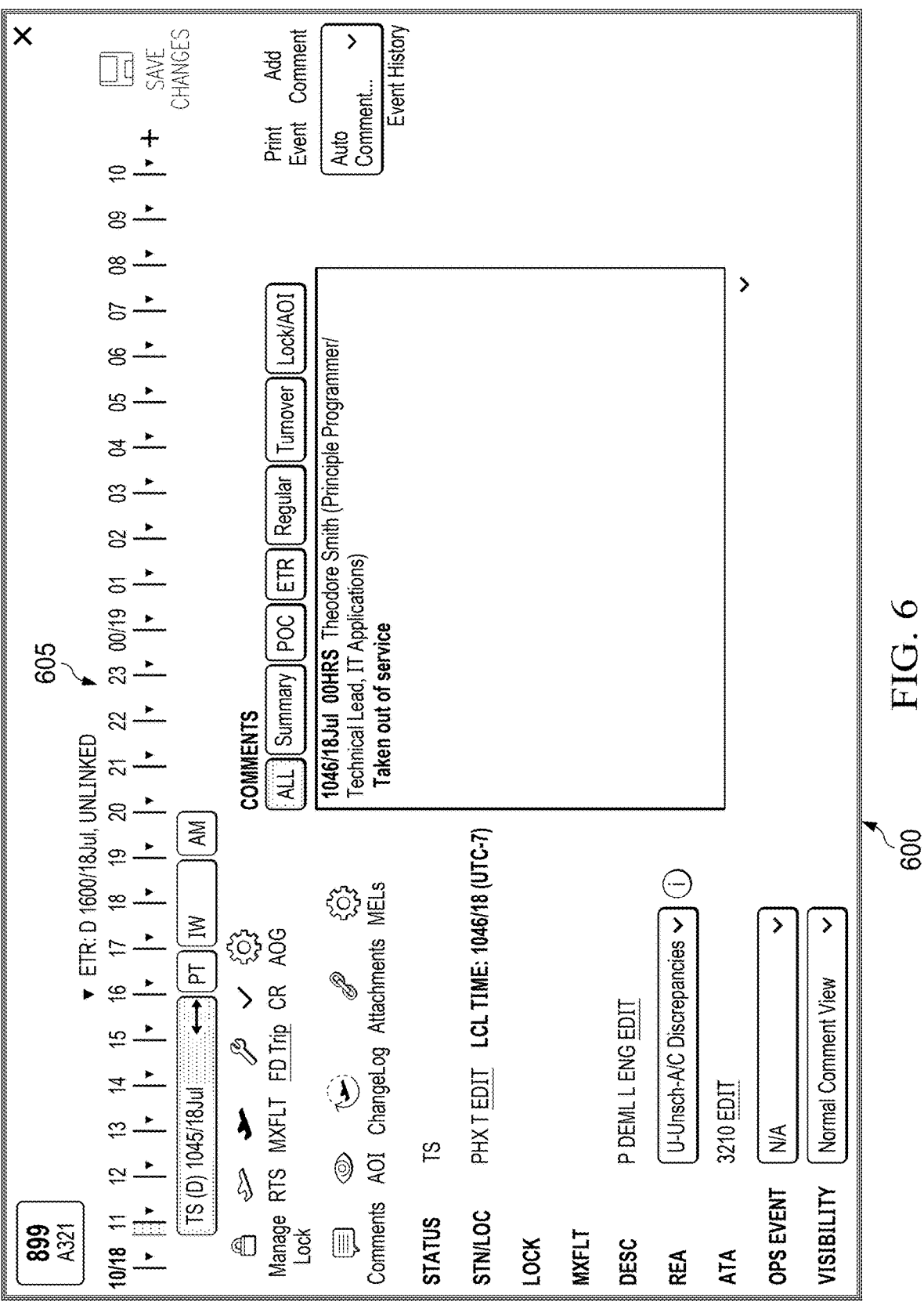
Figure 7:
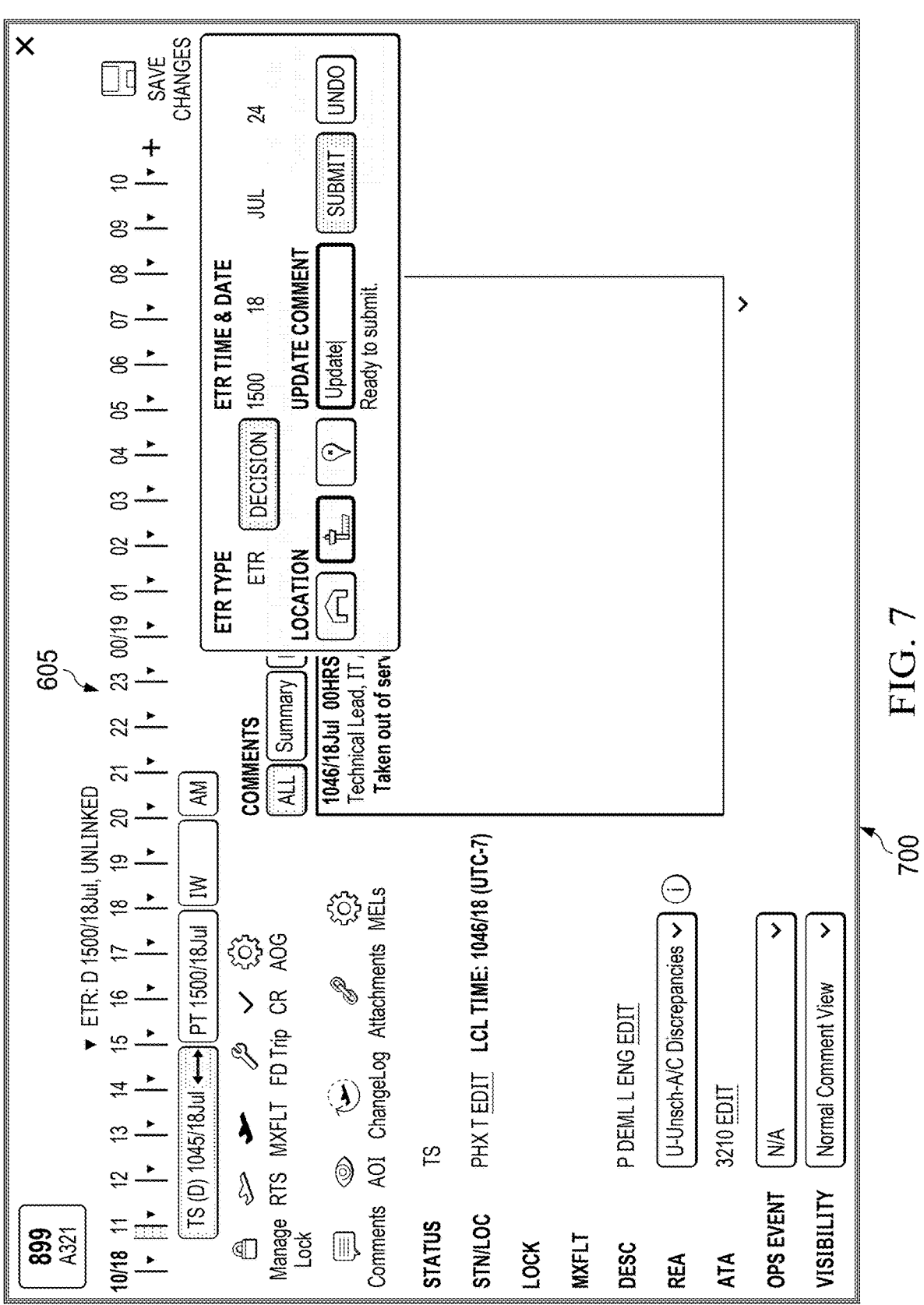
Figure 8:
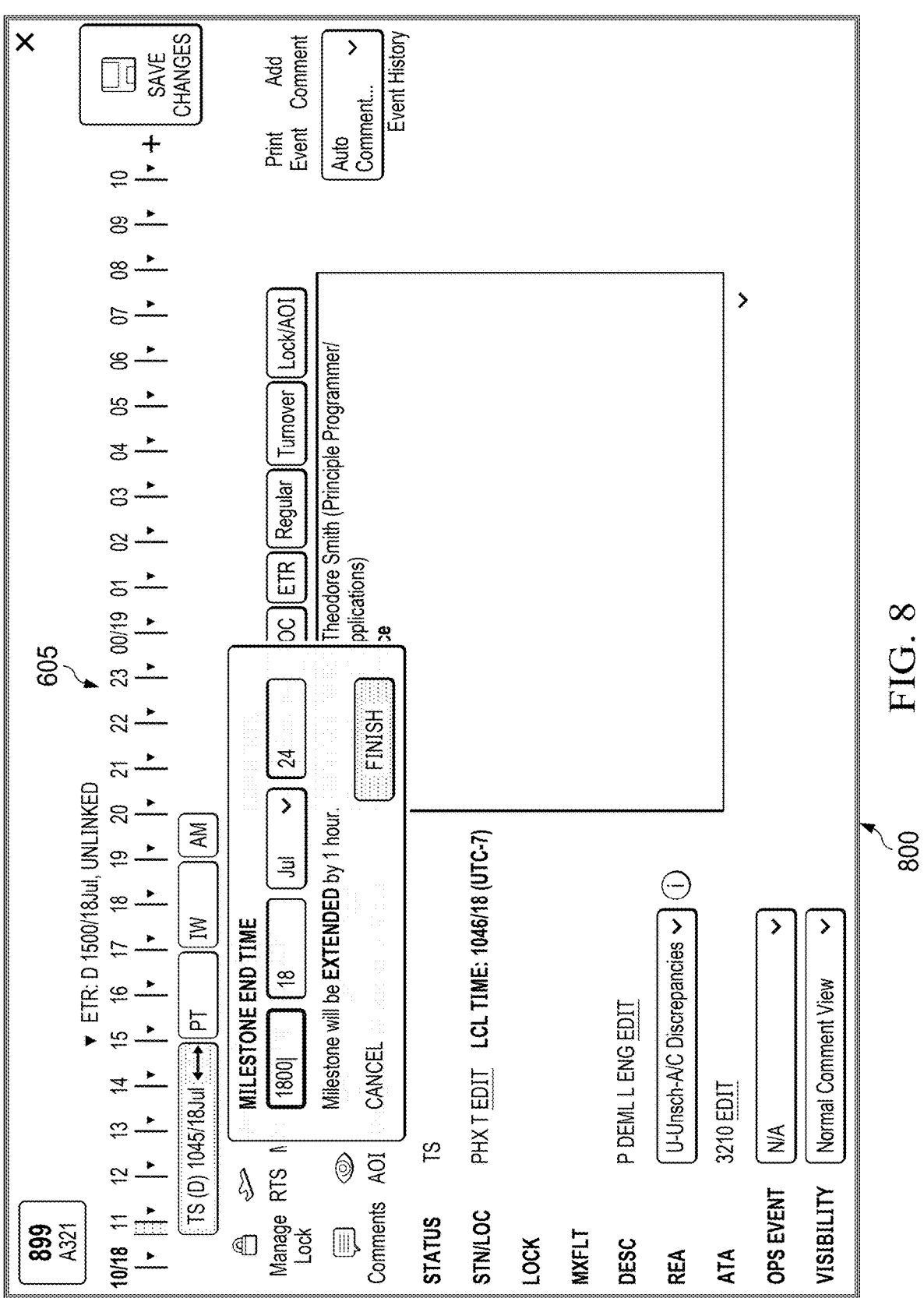
Figure 9:
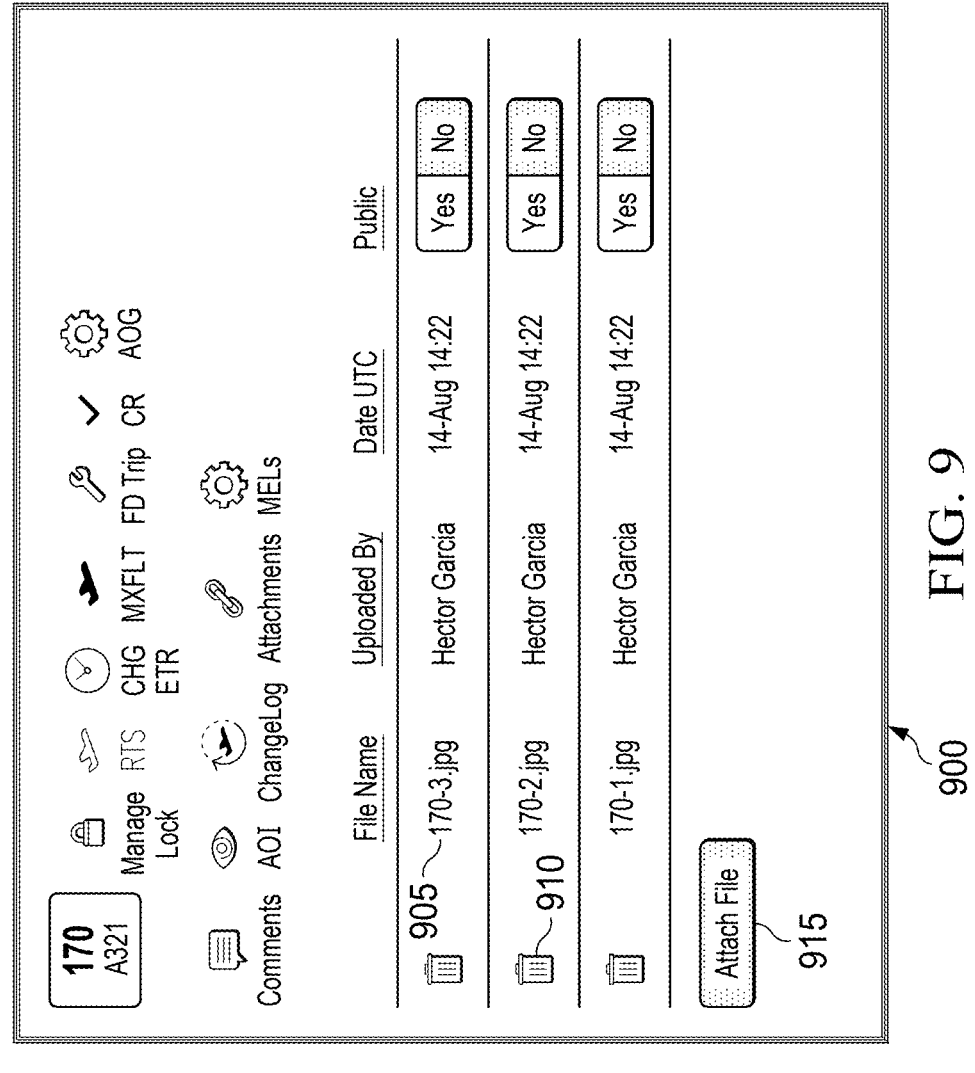

In some embodiments, the CHG ETR icon/text 520 selectable element opens a window that is associated with a request to change the ETR of the aircraft and is configured to receive a comment, an updated day, date, and/or time. FIG. 6 is an example illustration of a window 600 that opens when the user selects the CHG ETR icon/text 520 selectable element. FIGS. 7-9 are example illustrations of windows 700, 800, and 900, respectively, that are used to edit the ETR request. For example, and as illustrated in the comparison of windows 600 and 700, a user is capable editing the ETR start time from 16:00 to 15:00 such that a timeline 605 associated with the ETR is changed. As illustrated in the window 800, a user is capable of updating a milestone duration. Generally, the windows 600, 700, and 800 are used to build an accurate ETR. In some embodiments, the windows 600, 700, and 800 enables the management and prediction of the ETR based on historical tasks on a specific fleet type and aircraft.

In some embodiments and referring back to FIG. 5, the MXFLT icon/text 525 selectable element opens a window that is associated with selecting a ferry option, such as a functional flight check ("FCF"); maintenance validation flight ("MVF"), which is associated with a LOCK status; a maintenance ferry flight ("MFF"); a functional flight check creating a maintenance validation flight ("FCF+MVF"), which is also associated with a LOCK status; and a maintenance ferry flight creating a MVF ("MFF+MVF"), which is also associated with a LOCK status. In some embodiments, to remove a ferry option, a non-ferry selection (e.g., blank space on drop-down menu) is selected and a "remove MFF" selectable button selected, if applicable.

In some embodiments, the FD Trip icon/text 530 selectable element opens a window associated with marking an event as "field trip." In some embodiments, the window associated with the FD Trip includes: an option to select who will oversee the field trip (e.g., MOC); a field trip domicile station; an option to update the field trip; and an option to remove the field trip.

In some embodiments, the CR icon/text 535 selectable element open a window associated with concurrence required. In some embodiments, the window associated with the concurrence required allows for a user to set an aircraft as concurrence required or remove the designation of concurrence required.

In some embodiments, the AOG icon/text 540 selectable element opens a window that is associated with all the Aircraft on Ground ("AOG") items related to the aircraft. In some embodiments, the window that is associated with the AOG items will include a listing of comments for open AOGs at the top of the listing and comments for closed AOGS at the bottom of the listing.

In some embodiments, the AOI icon/text 550 selectable element opens a widow that is associated with the aircraft being an aircraft of interest. In some embodiments, the window associated with the AOI allows for a user to designate the aircraft as an AOI A/C or an AOI Candidate A/C or remove the designation.

In some embodiments, the ChangeLog icon/text 555 selectable element open a window that displays a change log flight listing and a change log ETRs listing.

In some embodiments, the Attachments icon/text 560 selectable element opens a window that is associated with the upload, download, edit, or deletion of media. FIG. 9 is an example illustration of a window 900 that allows a user to view or download media via a selectable element such as for example element 905, delete media via a selectable element such as element 910, and upload media via a selectable element such as element 915.

Figure 10:
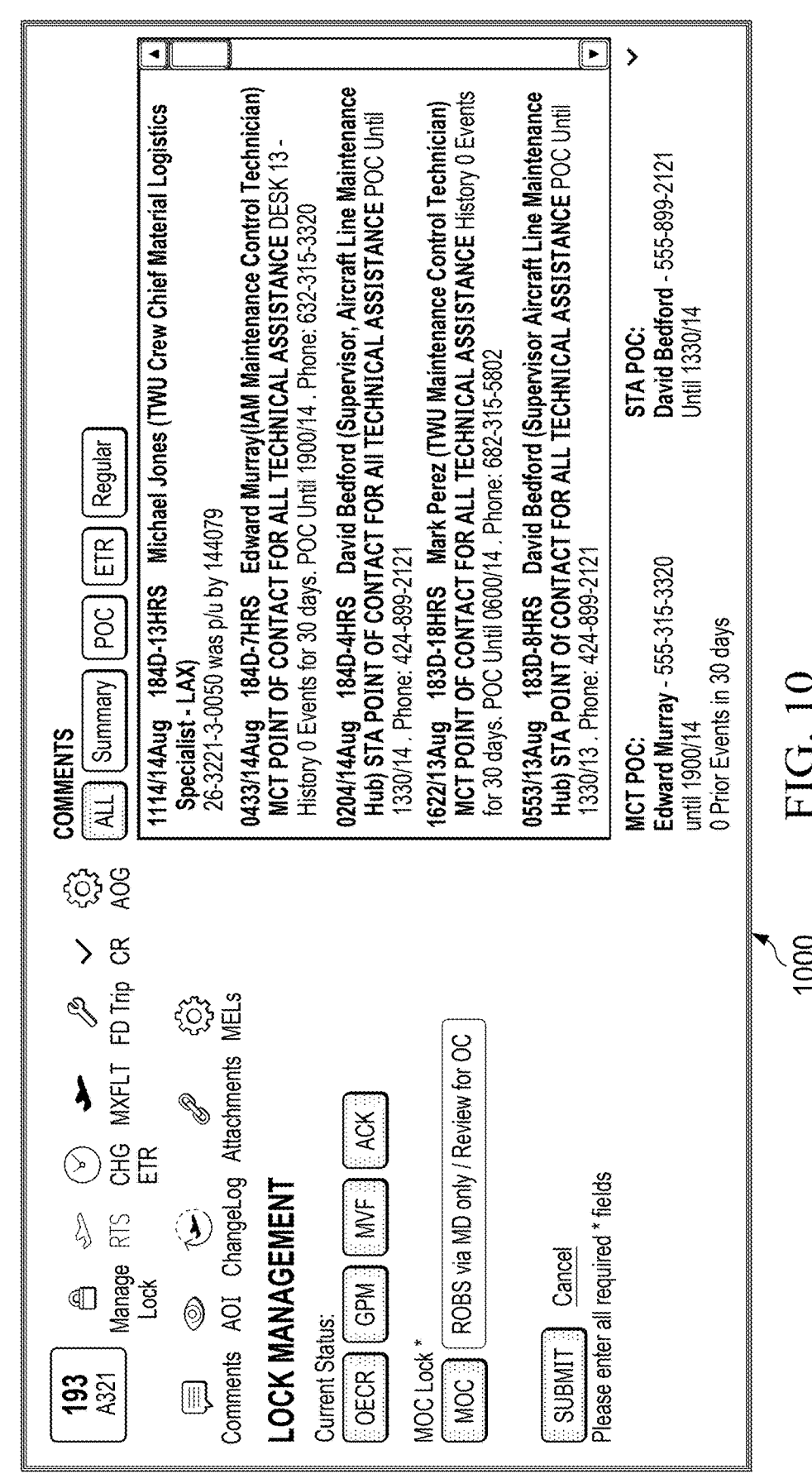

In some embodiments and referring back to FIG. 5, the LOCK status icon/text 585 selectable element that opens a window that is associated with a LOCK status. FIG. 10 illustrates an example window 1000 that is similar to the window 500 except the window 1000 is for a different aircraft (i.e., aircraft 193) that is locked. As illustrated, five Locks have been applied to aircraft 193. In some embodiments, LOCK Management has been established to automatically and manually lock an aircraft from return to service for a plurality of reasons. Example types of locks include MOC, GPM, HIST, A/I, etc. In some embodiments, a manual LOCK includes a MOC Lock, which requires a description of the LOCK; a data dependent LOCK, which is associated with various out of service data points that requires a Manager on Duty ("MOD") approval; and a time dependent LOCK, which is a FAA/Carrier requirement based on various operational times. In some embodiments, this automated and manual feature protects an airline from an illegal return to service of the aircraft. Generally, if all locks are removed, then the aircraft is eligible for return to service and the LOCK indication is removed from the window 1000.

In some embodiments and referring back to FIG. 5, the add comment text/icon 595 selectable element opens a comment user interface, which manages diverse comment types, including adding, editing, and deleting comments. In some embodiments, when a "free text" comment is provided, a user may add, update, delete, and/or customize and when a MCT POC, STA POC, AOS Summary, and MACT Turnover comment is provided a user may add, update, delete the template based comment. Other comment types may include a "concurrence required" comment, "return to service" comment, an "aircraft of interest" comment, an "aircraft detail update" comment, and "ETR milestone" comment.

Figure 11:
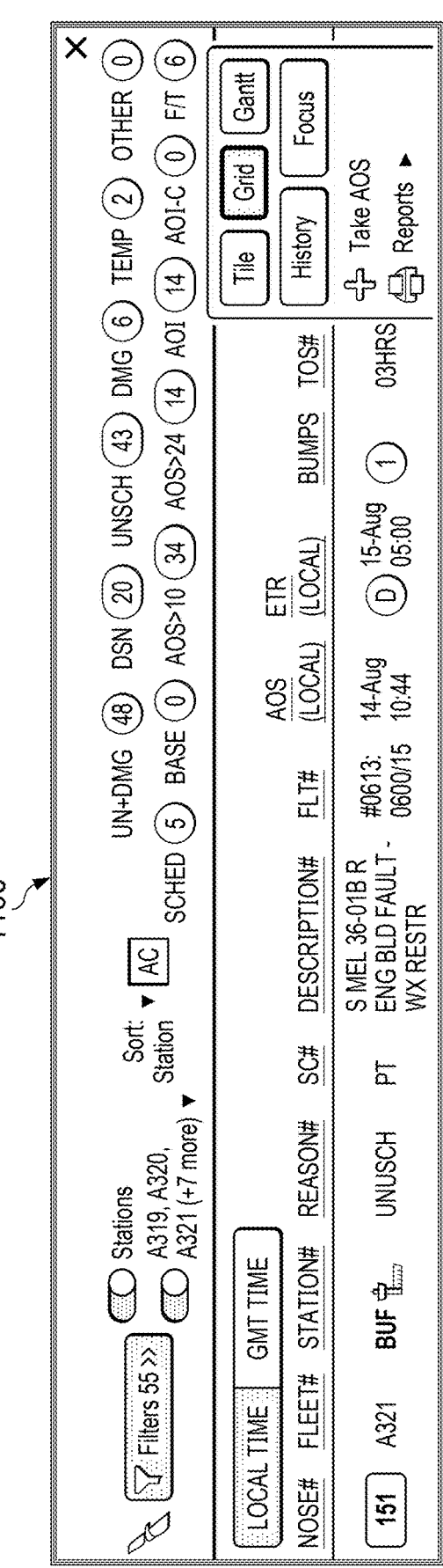

FIG. 11 is an example illustration of an overview window 1100 when the "Grid" view has been selected from the plurality of tabs 405. When the overview is arranged in a Grid view a matrix view of the tiles is displayed. While one tile is illustrated in window 1100, a plurality of tiles may be displayed in the window 1100 with each row being associated with a tile/aircraft. In Grid view, column headers include one or more of the categories associated with the data points shown in each tile. In some embodiments, the column headers can be selected for sorting. Selection of any tile/row while in the Grid view allows the user to view the same "Event Details" window (e.g., window 500) as when a tile is selected in tile view.

Figure 12:
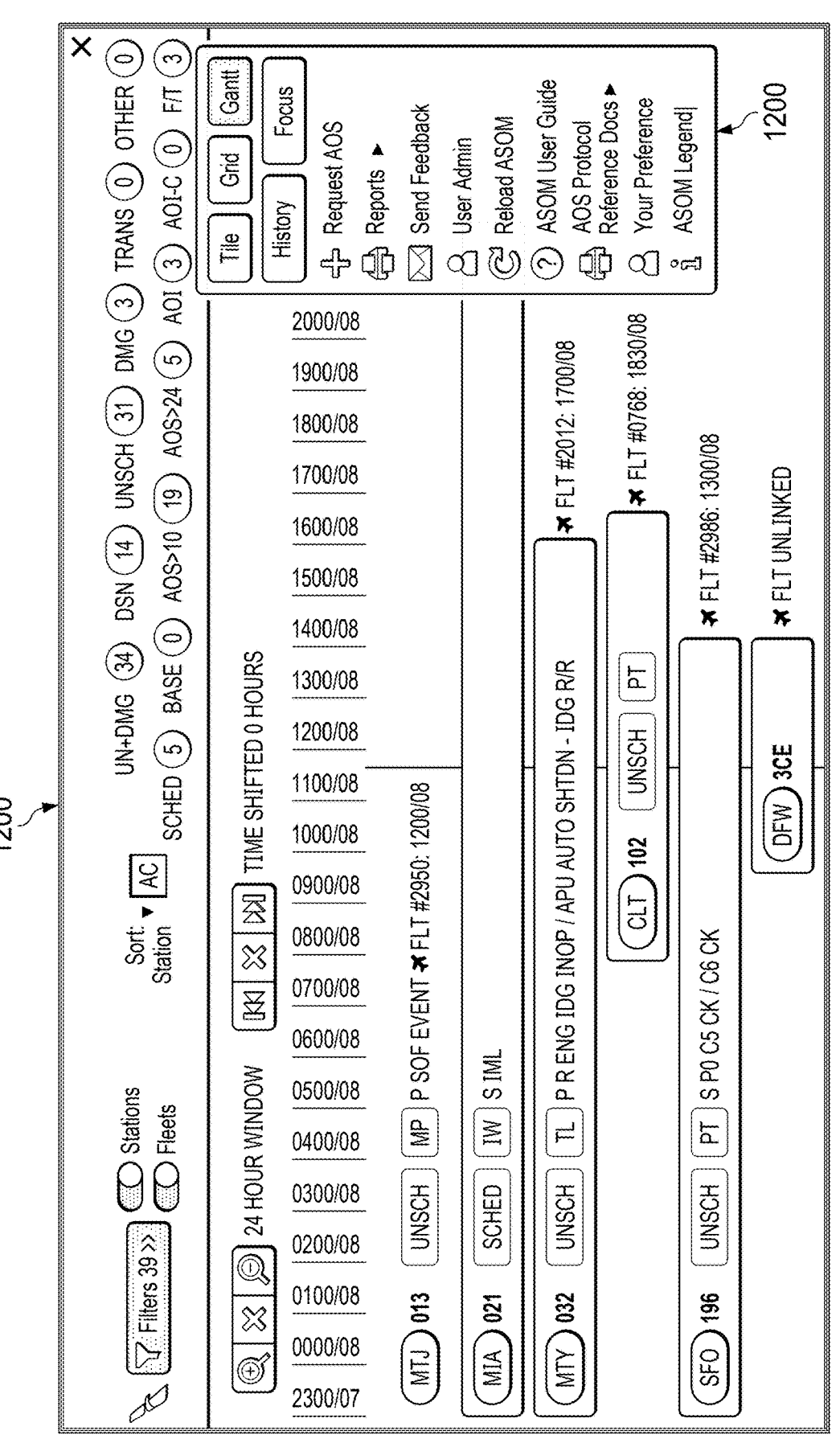

FIG. 12 is an example illustration of a portion of a window 1200 when the GANTT view has been selected from the plurality of tabs 405. When the overview is arranged in a GANTT view, a Gantt chart view of mini tiles is displayed based on the flight time and date associated with the aircraft. As such, the GANTT view is associated with the display of aircraft in a chronological format. In some embodiments, selection of any displayed mini tile while in the GANTT view allows the user to view the same "Event Details" window (e.g., window 500) as when a tile is selected in tile view.

Figure 13:
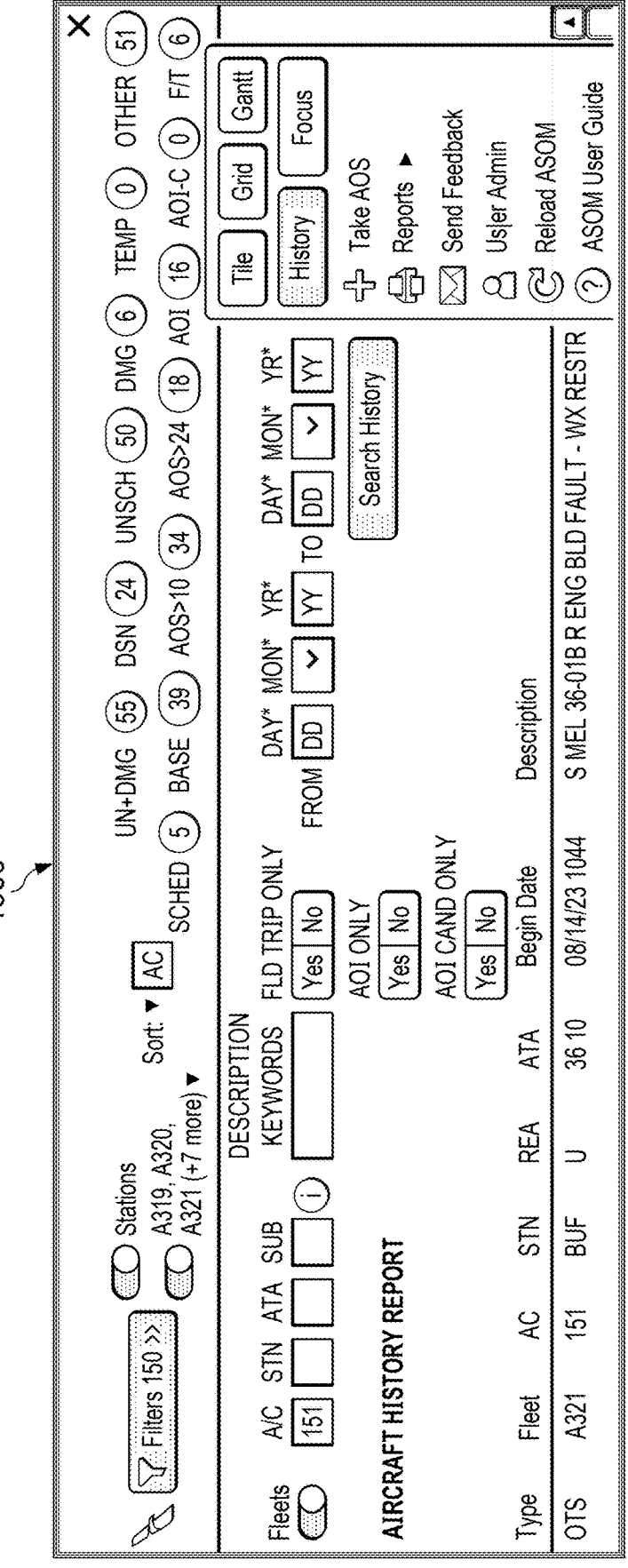
Figure 14:
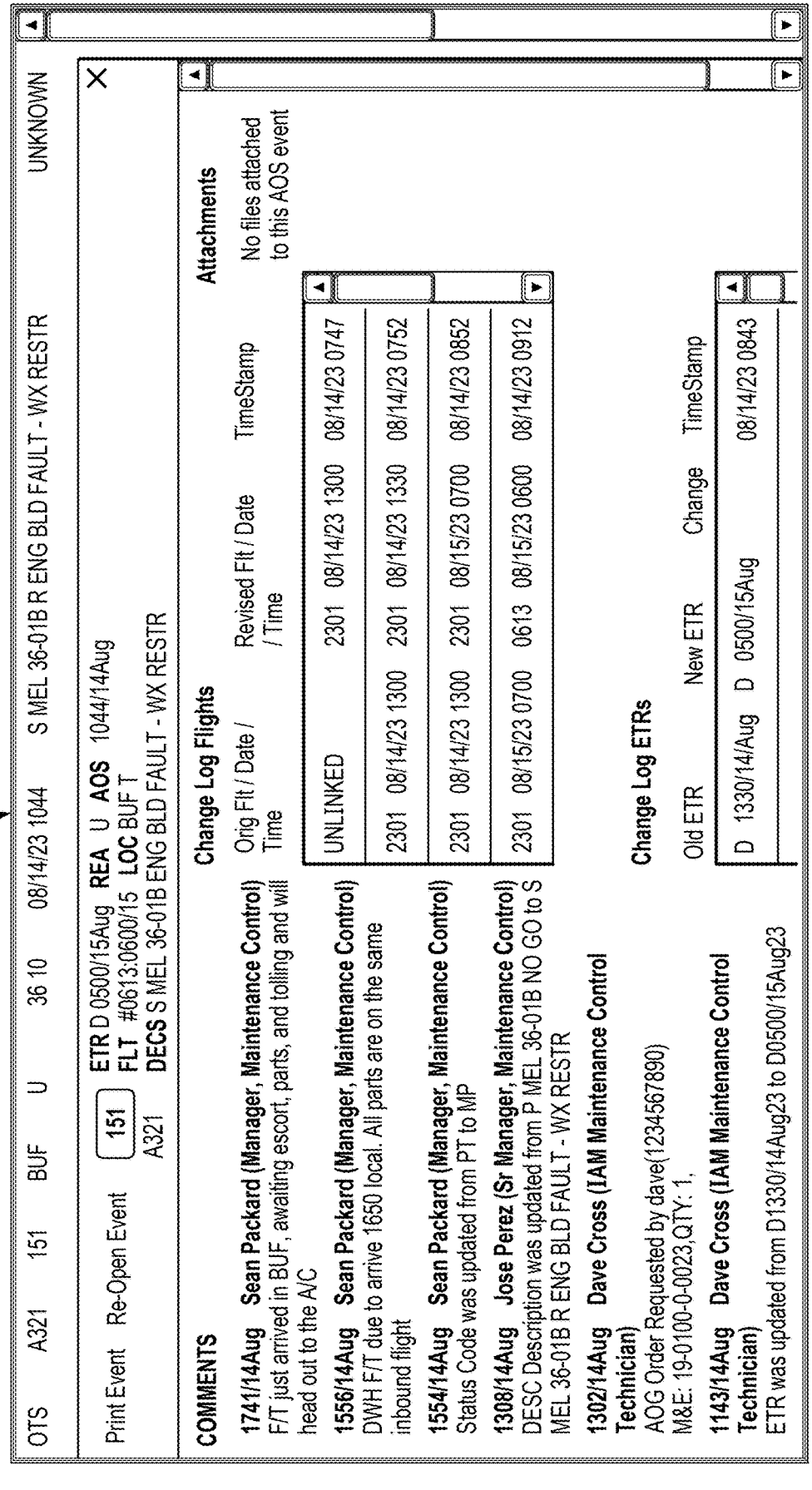

FIG. 13 is an example illustration of a portion of a window 1300 when the History view has been selected from the plurality of tabs 405. When the overview is arranged in the history view, present, historical, and trending AOS events associated with the aircraft are displayed. In some embodiments, data is available for two years based on business requirements and multiple filters are available for filtering/sorting the historical data. As illustrated, column headers include one or more of the categories associated with the data points associated with each tile. In some embodiments, each row is associated with a tile, either present or historical. Selecting a present or historical event row will open a window, such as the window 1400 as illustrated in FIG. 14, that displays comments for research, number of times for bumping the ETR, and/or how many flight changes have/had occurred. In some embodiments, the window 1400 includes a selectable "re-open event" element that, when selected, opens a window configured to reinitiate an AOS for the aircraft.

Figure 15B:
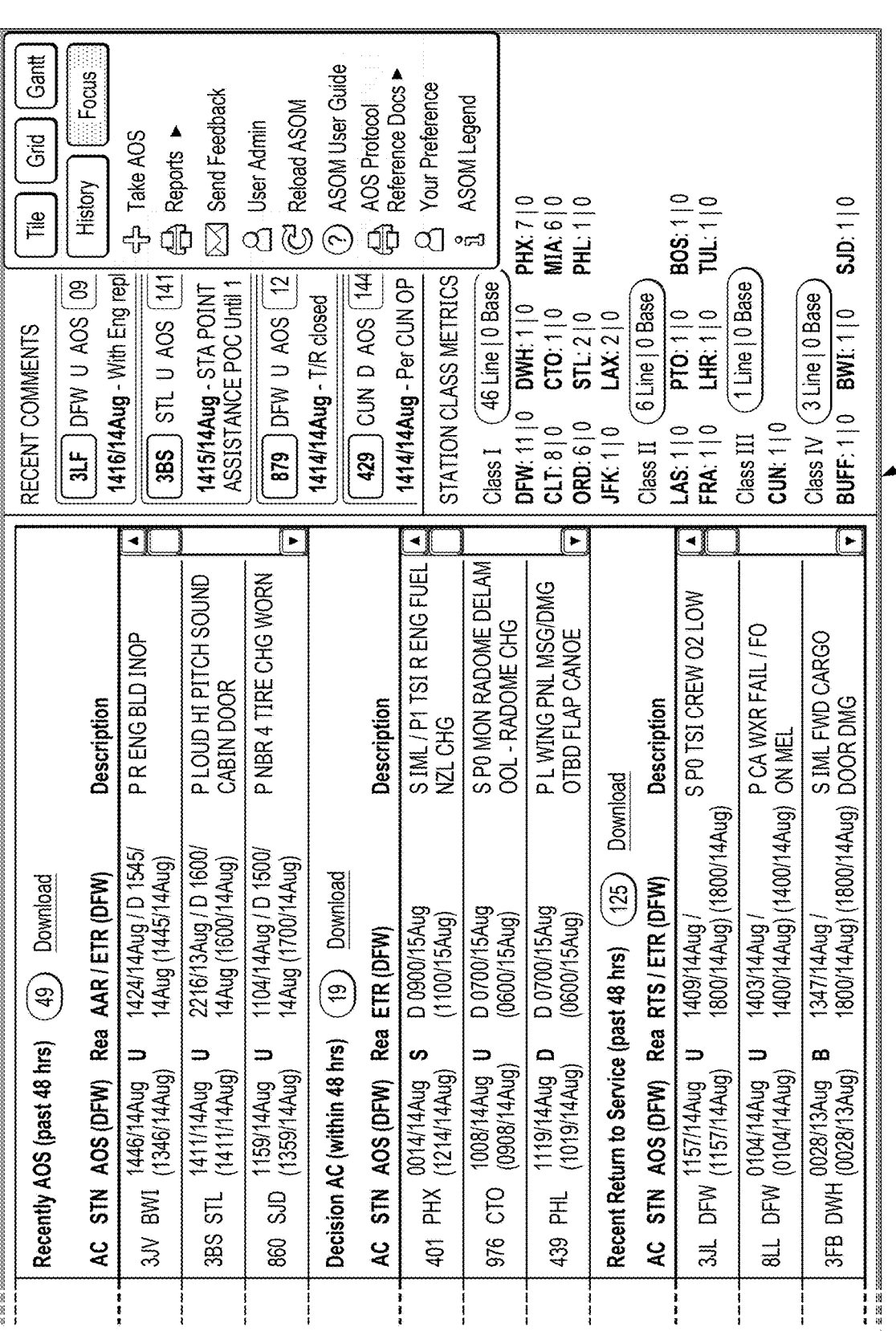

FIGS. 15A and 15B together are an example illustration of a window 1500 when the FOCUS view has been selected from the plurality of tabs 405. In some embodiments, when the overview is arranged in a FOCUS view, an analysis of the current state of the operations is displayed. In some embodiments, the window 1500 includes aircraft near ETR, Reason code updates, Recent ETR Changes, Recent AOS, Decision Aircraft, Recent RTS, Recent Comments and Station I, II, II and IV class metrics.

Figure 16:
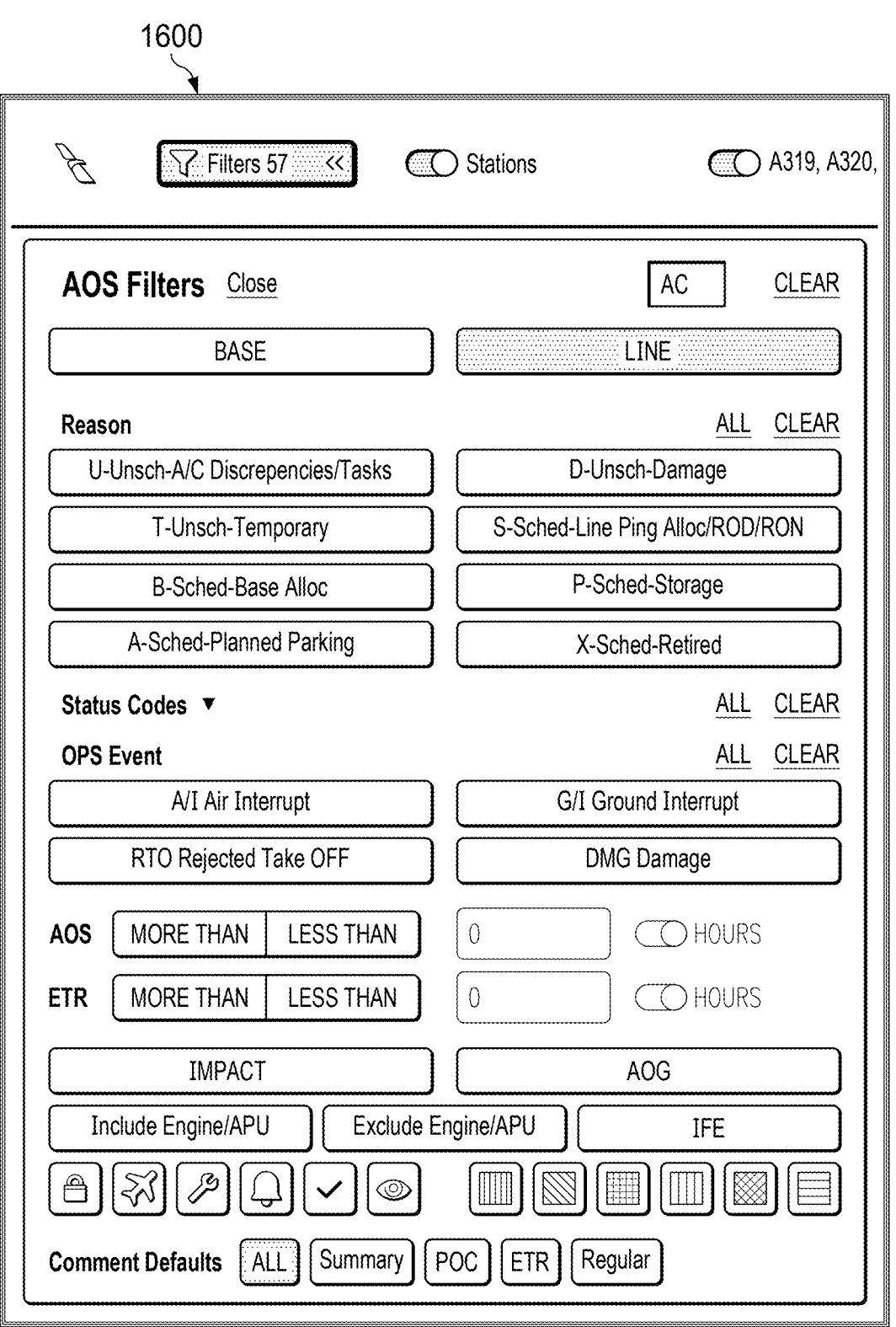

FIG. 16 is an example illustration of a window 1600 that opens when the reference drawer 315 illustrated in FIG. 3 is selected. In some embodiments, the window 1600 provides selectable filters for specialized queries. In some embodiments, a plurality of filters have been established based on business requests to include icon management, reason codes, LINE and BASE aircraft, Ops and Irregular Ops events, color designators and Comment defaults.

Figure 17:
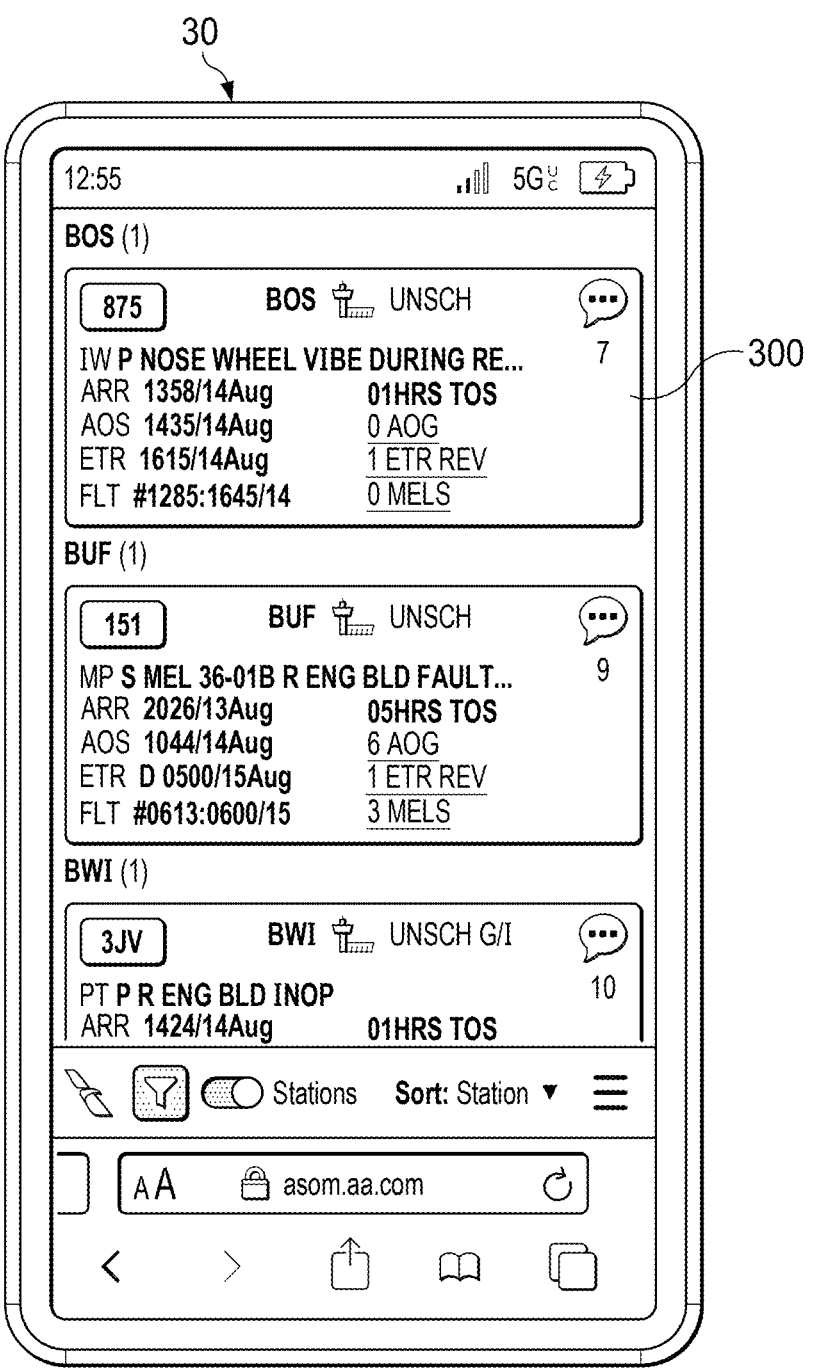
Figure 18:
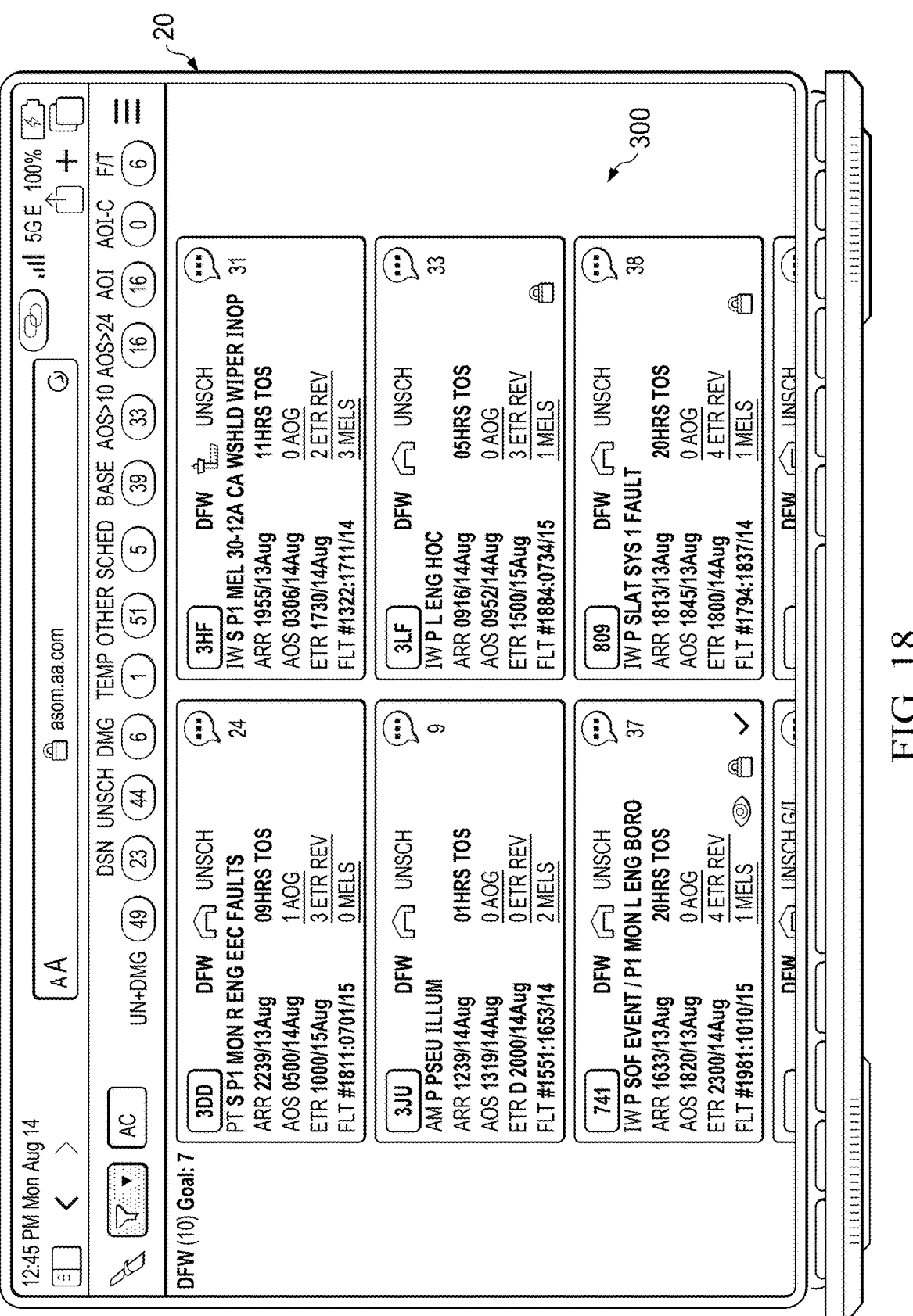

The ASOM application 75 is capable of displaying content and windows on a user interface of a computer 30 such as a mobile device or smartphone, as illustrated in FIG. 17, and a computer 20 such as a laptop, as illustrated in FIG. 18.

In some embodiments, and when a user would like to request to take an aircraft out of service, the user selects the selectable button "Take AOS" 410 as illustrated in FIG. 4. Upon selection of the Take AOS 410 button, a window is displayed that is configured to receive information from the user regarding the request to take AOS. FIG. 19 is example window 1900 for requesting an AOS, which is also used to build an accurate ETR. For example, the window 1900 includes data entry fields from AC, STA, AOS Time, Day, Month, YR, ATA, ETR Time, Day, Month, year, location, Reason, Ops Event, AOS Driver, Description Text, Initial Comment, and a timeline 1905 that includes the AOS time as well as ETR time. As illustrated, the time, day, month, and year as entered for the AOS time coincides with the AOS time illustrated in the timeline 1905. Similarly, the time, day, month, and year as entered for the ETR time coincides with the ETR time illustrated on the timeline 1905.

Figure 20:
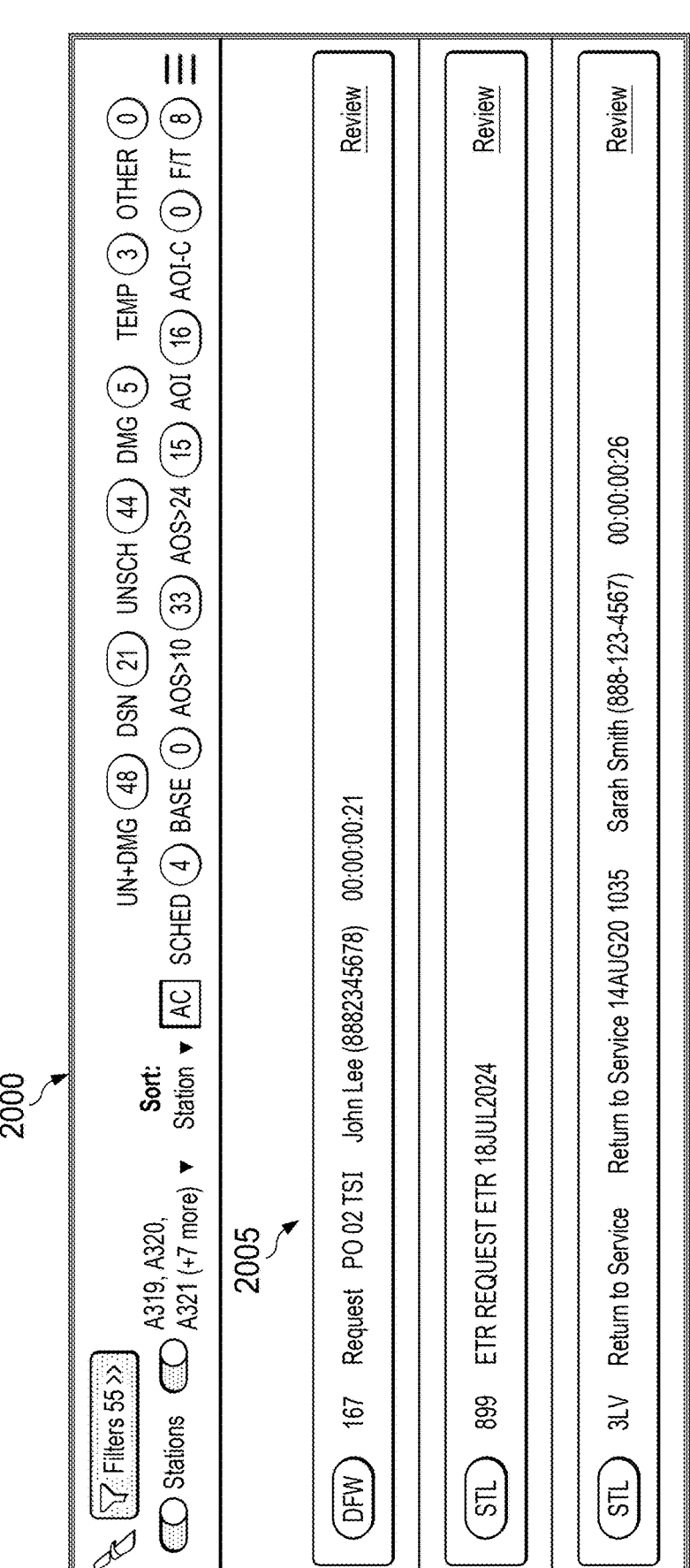

FIG. 20 is an example illustration of a window 2000 for communicating between stations and an Integrated Operations Center ("IOC"). As illustrated in the window 2000, a listing of requests 2005 are provided in the window 2000. In this example, one AOS Request, one ETR request, and one Return to Service is illustrated, but any number of requests may be listed. In some embodiments, each request is selectable by the user. In some embodiments, the listing of requests 2005 is viewable when the user has management permissions.

Figure 21:
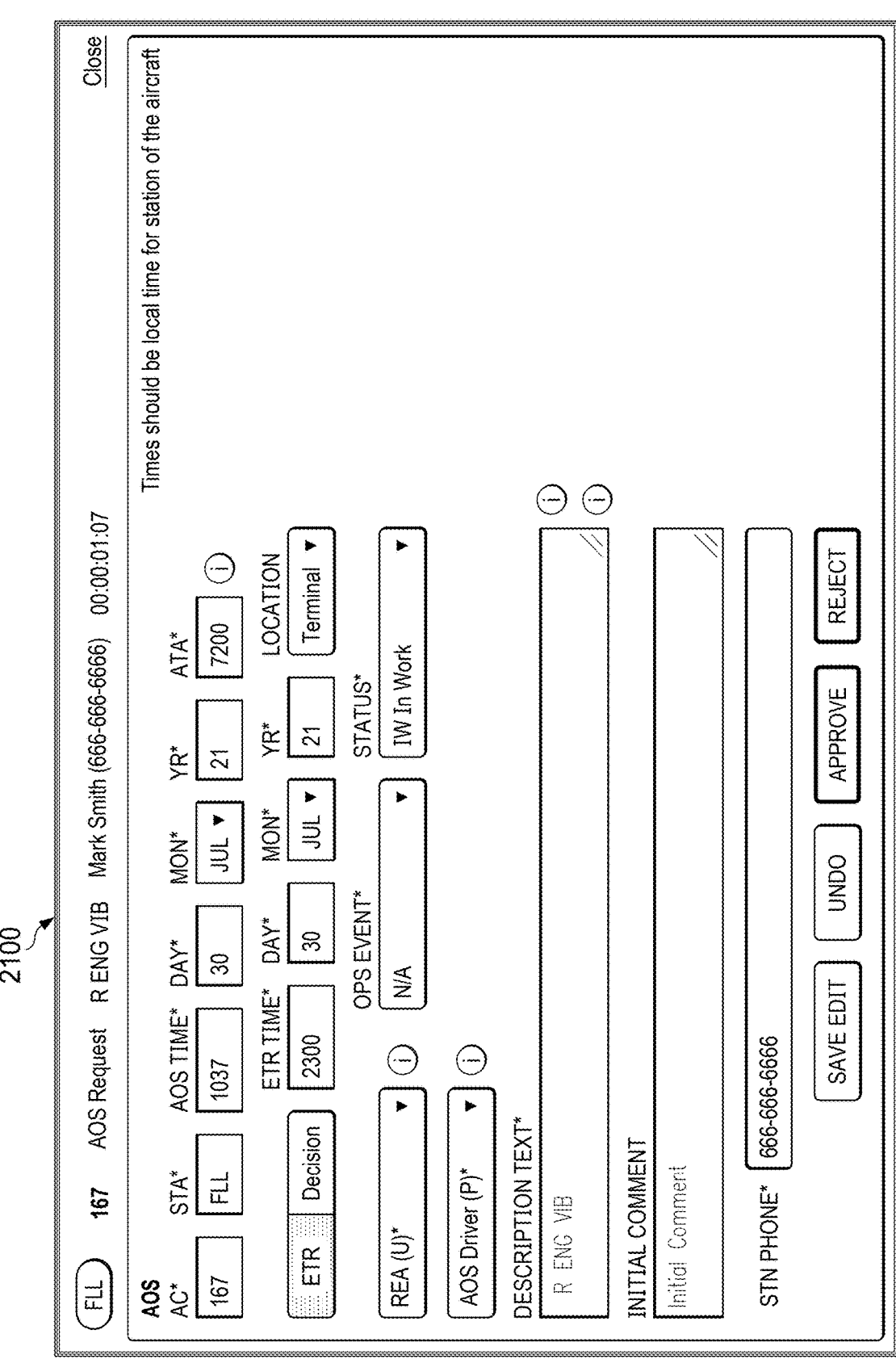

FIG. 21 is an example illustration of a window 2100 that is opened when an AOS request is selected from the listing of requests 2005. As illustrated, the window 2100 includes selectable approve, reject, undo, and save buttons such that the user can approve, reject, undo a change, or save a change to the AOS request. A similar window is opened when a Return to Service request is selected.

In some embodiments, the ASOM application 75 receives, via the plurality of windows, user instruction. In some embodiments, the user instruction comprises the selection of a tile or icon, entry of data, upload of media, etc. In some embodiments, the ASOM application 75 forms a portion of a front-end interface that interfaces with a user and communicates with a plurality of cloud systems, such as the first, second, and third cloud systems 100, 110, and 120. In some embodiments, the ASOM application 75 is a web-based program, Intranet-based program, and/or any combination thereof. In an example embodiment, the ASOM application 75 includes a computer program including a plurality of instructions, data, and/or any combination thereof. In an example embodiment, the application is written in, for example, Hypertext Markup Language (HTML), Cascading Style Sheets (CSS), JavaScript, Extensible Markup Language (XML), asynchronous JavaScript and XML (Ajax), iOS, XCode, Swift, Android for mobile, and/or any combination thereof. In an example embodiment, the ASOM application 75 is a web-based application written in, for example, Java or Adobe Flex, which pulls real-time information from the cloud systems 100, 110, and 120 via the CAMM 80. In some embodiments, the ASOM application 75 is or includes a mobile application.

Referring back to FIG. 1, and in some embodiments, the CAMM 80 is an application software system designed to seamlessly operate on diverse cloud platforms (e.g., cloud systems 100, 110, and 120) and utilize major cloud storage services as its backend for efficient media file management. In some embodiments, the CAMM 80 enables effortless migration of media files from one cloud storage repository to another, as well as facilitating real-time reconciliation and updates of media across multiple cloud platform storage repositories. In some embodiments, the CAMM 80 automates media migration capabilities and reconciliation features thereby simplifying media management tasks and enhancing data consistency across diverse cloud storage repositories. In some embodiments, the CAMM 80 solves technical problems in order provide unparalleled flexibility, security, and efficiency for users seeking a unified media management solution.

Figure 22:
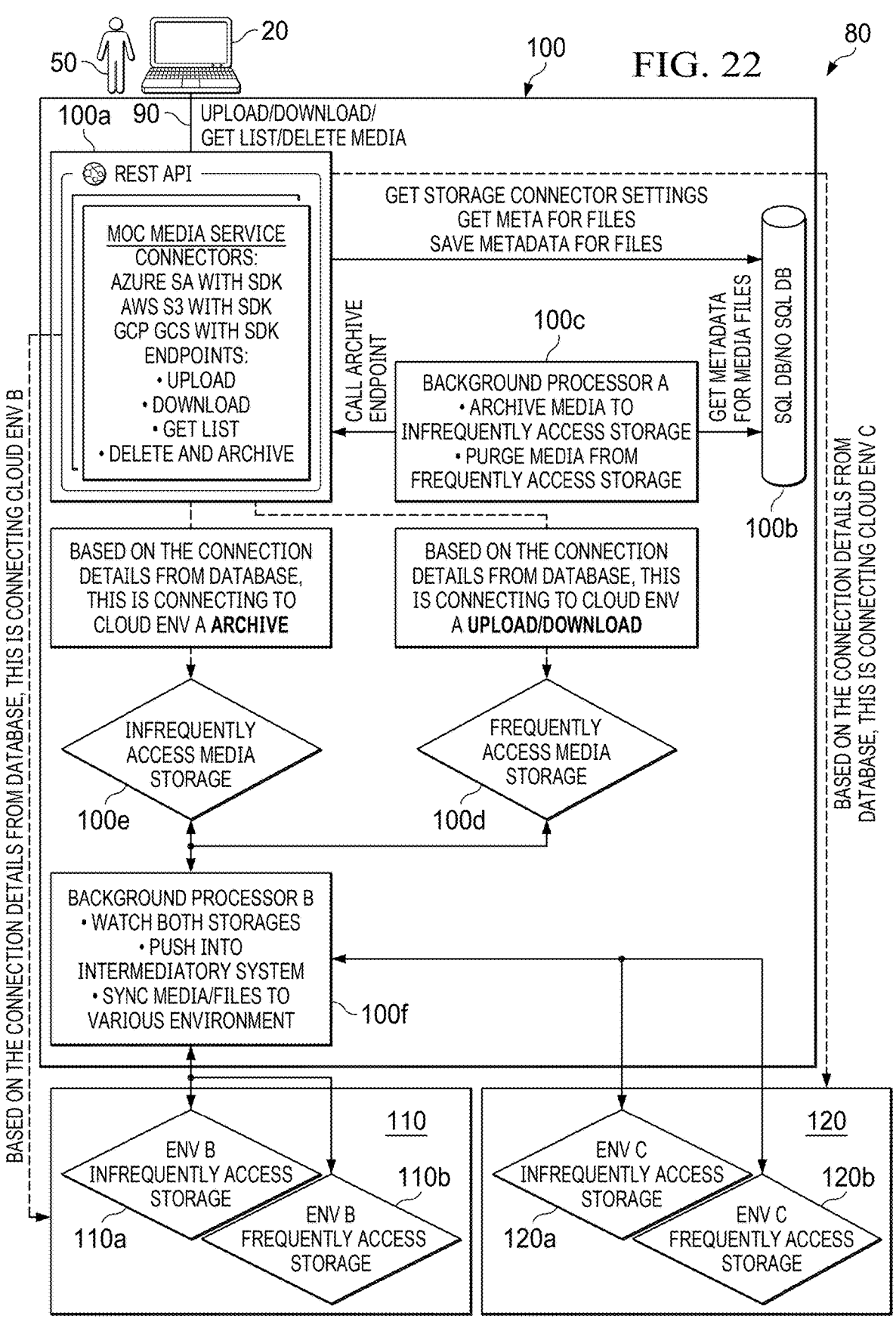
FIG. 22 is a diagrammatic illustration of a data flow associated with the system of FIG. 1, according to an example embodiment.

FIG. 22 is a diagrammatic illustration of a data flow associated with the CAMM 80, according to an example embodiment. As illustrated, the user 50 provides an instruction to the CAMM 80 via the computer 20 and the network 90. In this example, the instruction is received in the cloud system 100. As illustrated, the first cloud system 100 comprises a REST API 100a, a database 100b, a first processor 100c, a frequent access media storage 100d, an infrequent access media storage 100e, and a second processor 100f. The instructions are received by the REST API 100a from the ASOM application 75 and the computer 20. In some embodiments, MOC Media Service includes the connectors: Azure SA with SDK; AWS S3 with SDK; and GC GCS with SDK. In some embodiments, the endpoints include Upload, Download, Get List, and Delete and Archive. In the illustrated example, the user instruction may include an upload media instruction, a download media instruction, a get list instruction, and a delete media instruction. In some embodiments, the second cloud system 110 includes an infrequent access storage 110a and a frequent access storage 110b and the third cloud system 120 includes an infrequent access storage 120a and a frequent access storage 120b. In some embodiments, a "Get Storage Connector Settings"; "Get meta for files"; and "Save Metadata for files" is sent from the Rest API 100a to the database 100b. In some embodiments, the first processor 100c is capable of archiving media to the infrequent access storage 100e and purging media from the frequent access storage 100d, sending a "Get Metadata for media files" to the database 100b and a sending a call archive endpoint to the REST API 100a. In some embodiments, the processor 100c is an "event manager" and background processor capable of archiving media to "cold storage" or infrequent access storage, purging media from "hot storage" or frequent access storage, watching files, and pushing file(s) to queue for multi-cloud system (e.g., cloud systems 110 and 120). Based on the connection details from the database 100b and when a storage setting associated with the instruction is a frequent storage setting, the frequent access media storage 100d is accessed in response to the user instruction. In some embodiments, this is associated with upload/download endpoints. Further, and based on the connection details from the database 100b and when the storage settings associated with the instruction is an infrequent storage setting, the infrequent access media storage 100e is accessed in response to the user instruction. In some embodiments, the second processor 100f watches or monitors storages of the cloud system 110 (e.g., infrequent access storage 110a and frequent access storage 110b) and the cloud system 120 (e.g., infrequent access storage 120a and frequent access storage 120b); pushes changes into the intermediatory system; and syncs media/files to various environments. In some embodiments, the intermediatory system comprises the storages 100d and 100e, the API 100a, the database 100b, and the processor 100c. In some embodiments, the second processor 100f is an "event manager" and background processor that is capable of reading files from queue and pushing to respective storages. While only two processors are illustrated in FIG. 22, in some embodiments fourteen background processors are used to reconcile data with legacy systems, data warehouses, and modern data lake systems. In some embodiments, the cloud system 110 includes a second processor 100f and the cloud system 120 includes a second processor 110f. In some embodiments, the processors 100c and 100f ensure real-time data availability to other airline applications requiring access to out-of-service data. Moreover, and in some embodiments, the processors 100c and 100f trigger real-time notifications for specific aircraft updates, keeping management and support users informed about critical events.

Figure 23:
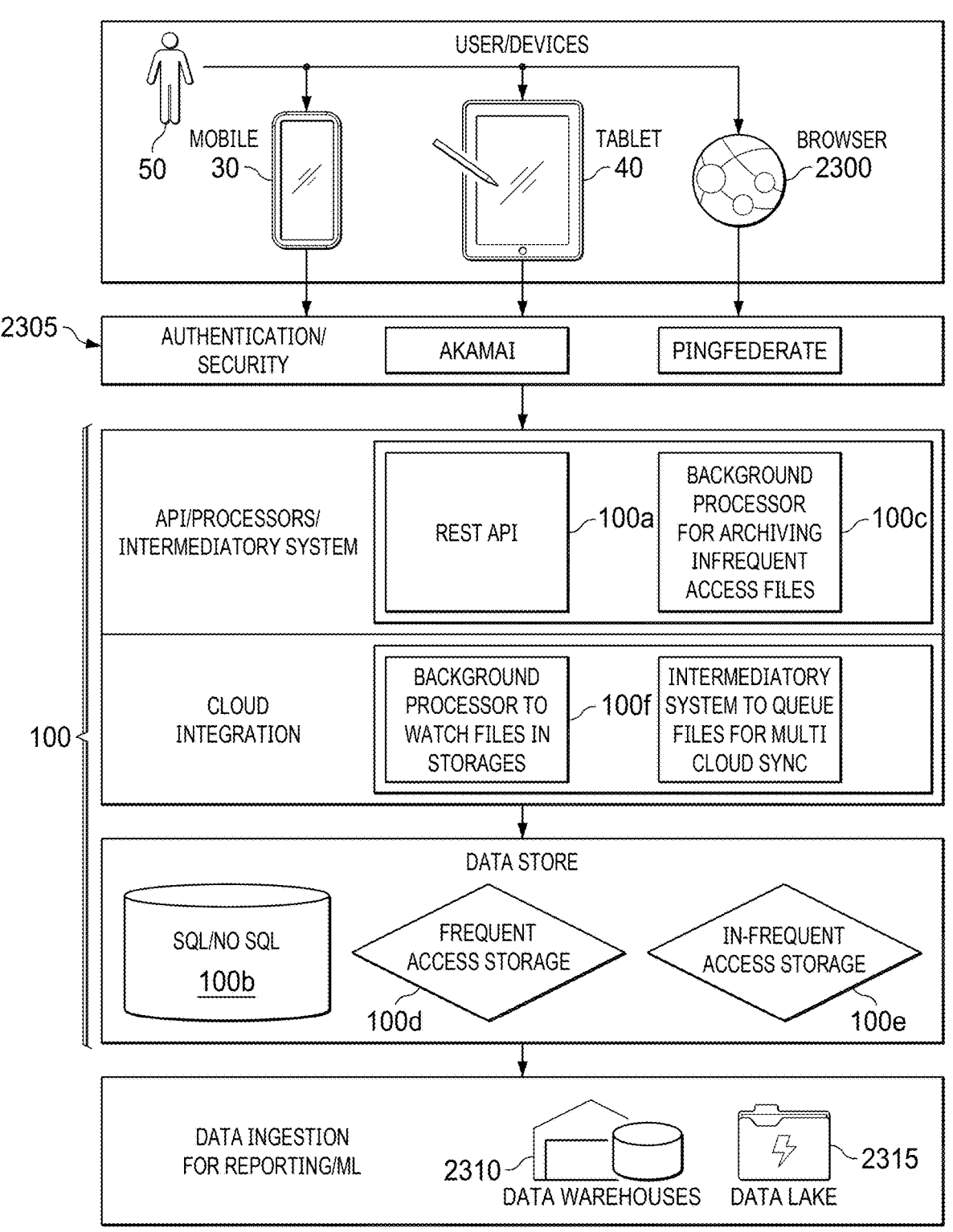
FIG. 23 is a logical diagram associated with the system of FIG. 1, according to an example embodiment.

FIG. 23 is an example logical diagram associated with the CAMM 80, according to an example embodiment. As illustrated, the user 50 provides an instruction to the CAMM 80 via the computer 40 such as a tablet, the mobile device 30, and/or a browser 2300. The instruction initially passes through authentication/security 2305 and then to the cloud 100. Data is either stored, accessed, updated, and/or deleted from the data warehouses 2310 and data lake 2315. In some embodiments, the data warehouses 2310 and/or the data lake 2315 is or comprises the second and third cloud systems 110 and 120.

Figure 24:
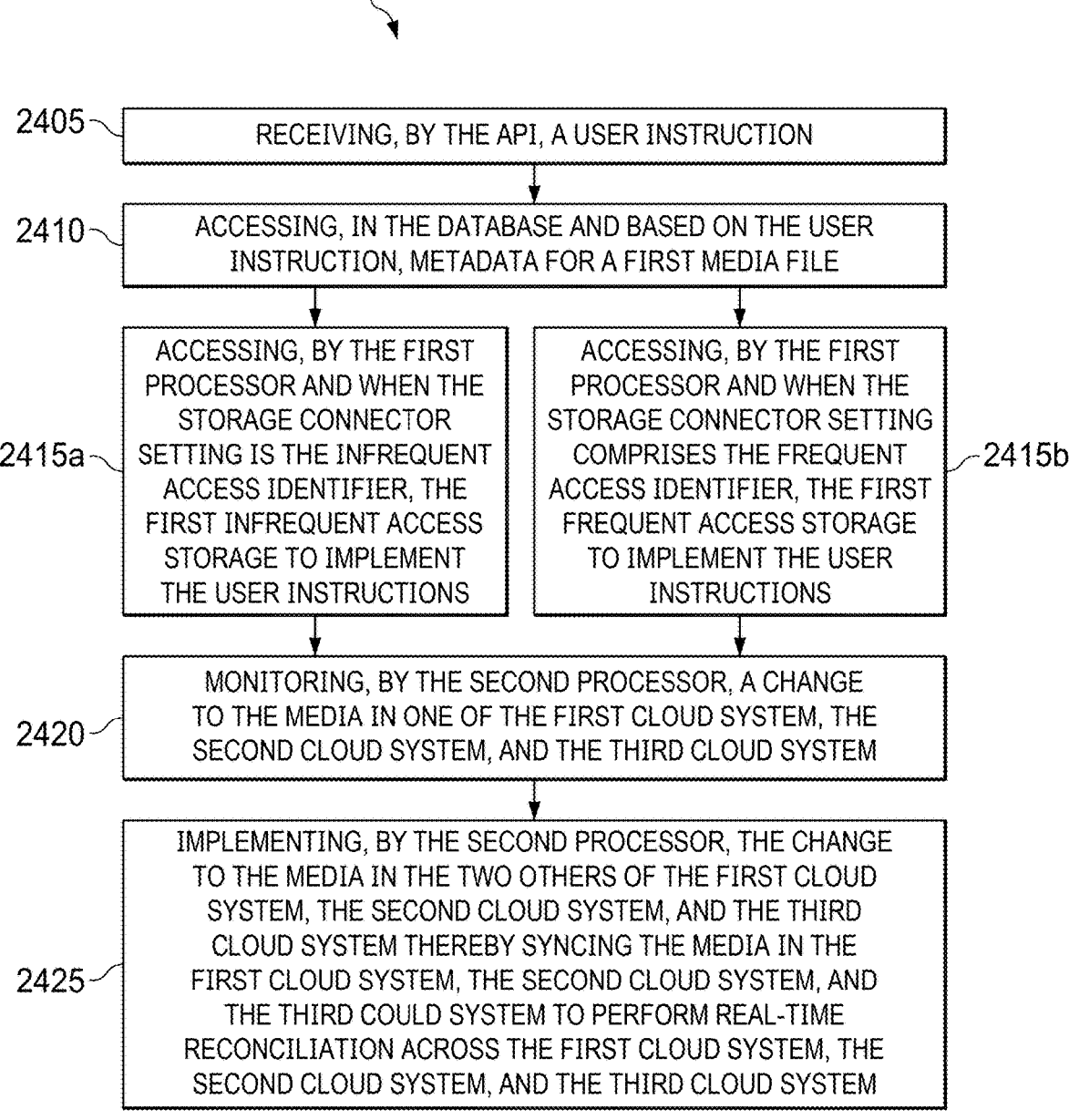
FIG. 24 is a flow-chart diagram of a method of using the system of FIG. 1, according to an example embodiment.

In an example embodiment, as illustrated in FIG. 24 with continuing reference to FIGS. 1-23, a method 2400 of operating the system 10 includes receiving, by the API, a user instruction at step 2405; accessing, in the database and based on the user instruction, metadata for a first media file at step 2410; accessing, by the first processor and when the storage connector setting is the infrequent access identifier, the first infrequent access storage to implement the user instruction at step 2415*a*; accessing, by the first processor and when the storage connector setting is the frequent access identifier, the first frequent access storage to implement the user instruction at step 2415*b*; monitoring, by the second processor, a change to the media in one of the first cloud system, the second cloud system, and third second cloud system at step 2420; and implementing, by the second processor, the change to the media in the two others of the first cloud system, the second cloud system, and the third cloud system thereby syncing the media in the first cloud system, the second cloud system, and the third could system to perform real-time reconciliation across the first cloud system, the second cloud system, and the third cloud system at step 2425.

In some embodiments and at the step 2405, the user instruction is received by the API. In some embodiments, the instruction is received via a window displayed by the ASOM application 75 and the user instruction is an upload media command, a download media command, a get list command, and/or a delete media command. In some embodiments, a user instruction received via the ASOM application 75 is sent to the API 100*a*.

In some embodiments and at the step 2410, the metadata for the first media file is accessed in the database and based on the user instruction. In some embodiments, the metadata for the first media file is used to determine a storage connector setting associated with the first media file. In some embodiments, the storage connector setting is either an infrequent access identifier or a frequent access identifier.

In some embodiments and at the step 2415*a*, the first infrequent access storage is accessed by the first processor when the storage connector setting is the infrequent access identifier. The step of accessing, by the first processor (e.g., processor 100*c*), the first infrequent access storage 100*e* includes saving metadata and/or media in the infrequent access storage 100*e*.

In some embodiments and at the step 2415*b*, the first frequent access storage is accessed by the first processor when the storage connector setting is the frequent access identifier. The step of accessing, by the first processor (e.g., the processor 100*c*), the first frequent access storage 100*d* includes saving metadata and/or media in the frequent access storage 100*d*.

In some embodiments and at the step 2420, the second processor monitors a change to the media in one of the first cloud system, the second cloud system, and third second cloud system. In some embodiments, the second processor 100*f* monitors the storages by reading files from a queue and pushing to other cloud systems. In some embodiments, the first processor 100*c* sends a file and/or change to the queue and the second processor 100*f* reads the queue and makes changes to the cloud system 110 and cloud system 120.

In some embodiments and at the step 2425, the second processor implements the change to the media in the two others of the first cloud system, the second cloud system, and the third cloud system thereby syncing the media in the first cloud system, the second cloud system, and the third could system to perform real-time reconciliation across the first cloud system, the second cloud system, and the third cloud system. In some embodiments, the second processor is the processor 100*f*; the first cloud system is the cloud system

100, the second cloud system is the cloud system 110, and the third cloud system is the cloud system 120.

One example method 2400 includes the user instruction being the upload command to upload the first media file. An example of the user instruction being an upload command of the first media file is when the user selects the "attach file" button 915 illustrated in FIG. 9 and attaches media via the attach file button. The user instruction may further comprise a source identifier associated with the first media file, such as a user identifier or name for the user that requested the upload, and a destination cloud storage for the first media file. In this example, the metadata for the first media file comprises an upload date and the upload date is used to determine that the storage connector setting associated with the first media file is the frequent access identifier. Accessing the first frequent access storage, by the first processor and due to the connector setting being the frequent access identifier, comprises uploading the first media in the first frequent access storage thereby implementing the user instruction. Monitoring, by the second processor, the change to the media in one of the first cloud system, first cloud system, and the second cloud system comprises monitoring the upload of the first media in the first cloud system; and wherein implementing, by the second processor, the change to the media in the two others of the first cloud system, the second cloud system, and the third cloud system comprises uploading the first media to the second frequent access storage of the second cloud system and/or the third frequent access storage of the third cloud system.

Another example method 2400 includes the user instruction being the download command of the first media file. In this example, the method 2400 may further comprise a step of the first processor 100*c* determining that the storage connector setting for the first media file is the infrequent access identifier. In this example, the API 100*a* gets from the database 100*b* the storage connector setting associated with the first media file, which is the infrequent access identifier, and the first processor 100*c* accesses the infrequent access storage 100*e* to retrieve the first media in the first infrequent access storage 100*e* thereby implementing the user instruction. The method 2400 may further include in this example providing, by the API 100*a* and via a window displayed by the ASOM application 75, the first media file for download. An example of a user instruction being the download command of the first media file is when the user selects the selectable icon/text 905 illustrated in FIG. 9.

Yet another example method 2400 includes the user instruction being the get list command to get a first list. An example of a user instruction being the get list command to get a first list is when the user selects the one of the filters in the plurality of filters 575 illustrated in FIG. 5 such that a listing of the filtered comments is queried by the CAMM 80 via the ASOM application 75. In this example, the first list is associated with the filtered comments and the method 2400 further includes accessing, in the database 100*b* and based on the user instruction, metadata for each media file in the plurality of media files; creating a listing that includes, for each media file in the plurality of media files, at least a portion of the metadata for each media file in the plurality of media files; and providing, by the API 100*a* and to the user via a window displayed by the ASOM application 75, the listing thereby implementing the user instruction. An example of at least a portion of the metadata for each media file is the username associated with each comment. Additionally, and in some embodiments, the user selecting a tile from the plurality of tiles is a user instruction of "get list" with the get list being the event details associated with the selected tile. In some embodiments, the user selecting any selectable element that opens a window displaying additional data is a user instruction of a "get list."

Yet another example method 2400 includes the user instruction being the delete command to delete the first media file. An example of a user instruction being the delete command to delete the first media file is when the user selects the selectable delete icon 910 illustrated in FIG. 9. In this example, if the storage connector setting is the infrequent access identifier, then the first processor accesses the infrequent access storage to delete the first media file, but if the storage connector setting is the frequent access identifier, then the first processor accesses the frequent access storage to delete the first media file. The change to the media in the one of the first cloud system, the second cloud system, and the third cloud system is the deletion of the first media file from the first cloud system; and implementing, by the second processor, the change to the media in the two others of the first cloud system, the second cloud system, and the third cloud system comprises deleting the first media file from the second cloud system and the third cloud system.

In some embodiments, the ASOM application 75 uses WebSocket and/or Socket 10 to push delta updates and/or changes from all users of the ASOM application 75 to data services, which connects to the API 100*a* to get data. In some embodiments, the ASOM application 75 uses WebSocket and/or Socket 10 to push requests for AOS, RTS, and ETR changes to data services, which connects to the API 100*a* and/or services to get the data. In some embodiments, the ASOM application 75 uses state services to keep the data consistent across all of the views; to maintain the application state across multiple browsers; and to feed the data to other services, functions, pipes, and components. In some embodiments, the services, pipes, and functions tailor data for the view and component and holds a temporary state switching between components. In some embodiments, components get data from services and functions; get data from state services; and tailor parameters, state data, and services data for views. In some embodiments, views represent AOS data in various format, such as tile, grid, and Gantt; provides interfaces to manages aspects of the AOS data such as comments, descriptions, AOGs, statuses, etc.; and provides various one touch filtering options along with sorting.

In some embodiments, the ASOM application 75 provides a user experience via a SPA in bowser or a mobile application; uses middleware to cache for AOS Data and frequently accessed data; uses backend systems such as AOS API, AOS notification, CAMM services, Aircraft Out of Service Natural Language Processing ("AOS NLP"), Employee Data Function, and Event Manager processor; and uses data in a ASOM database, other systems such as AOG, Flight AP, K2, flight operating systems, media/file storage, media/file storage archive, and employee central as well as data warehouses and a data lake.

In some embodiments, the first processor 100*c* changes, based on metadata associated with the first media file, the storage connector setting from the frequent access identifier to the infrequent access identifier. In some embodiments, the first processor 100*c* automatically migrates the first media file to the first infrequent access storage 100*e* and purges the first media file from the first frequent accessed storage 100*d*. In some examples, the metadata comprises a timestamp associated with the first media file and the timestamp is associated with modification or creation of the first media file. For example and in some embodiments, the processor 100*c* may calculate a duration of time from the timestamp; determine that that the duration of time exceeds a threshold period of time; and migrate the data from the first frequent access storage to the first infrequent access storage in response to the determination that the duration of time exceeds the threshold period of time. In some embodiments, the threshold period of time is 2 months, 4 months, 6 months, 8 months, 10 months, 1 year, and/or 1.5 years.

In some embodiments, the CAMM 80 enables effortless migration of media files from one cloud storage repository to another, as well as facilitates real-time reconciliation and updates of media across multiple cloud platform storage repositories. For example, the second processor 100*f* is capable of replicating the media in the second cloud system 110 and the third cloud system 120 to a fourth cloud system having a cloud computer service model that is different from the cloud computer service model of the second cloud storage system.

In some embodiments, the ASOM application 75 and/or the CAMM 80 allows for real-time updates that are facilitated via the API 100*a* and WebSocket system that ensures users receive up-to-date information about out-of-service aircraft across the entire airline. Additionally, the ASOM application 75 uses the CAMM system 80, which allows for seamless storage and retrieval of aircraft-related data.

In some embodiments, the ASOM application 75 utilizes end-to-end encryption during all internet transactions through REST APIs, such as the REST API 100*a*. In some embodiments, the ASOM application 75 uses a Ping Federate authentication system with granular and robust role management to ensure secure user access. In some embodiments, data integrity checks and comprehensive error handling mechanisms are in place to prevent data loss and maintain the application's reliability.

In some embodiments, the ASOM application 75 is a comprehensive solution for efficiently managing and monitoring out-of-service aircraft within an airline. In some embodiments, the ASOM application 75 introduces multiple views to represent current out-of-service aircraft as events, with advanced sorting and filtering capabilities for improved data presentation. In some embodiments, the three different views comprise a display and related reporting of out of service aircraft; a query and research view; and an update function view to be performed on out of service aircraft. Furthermore, users of the ASOM application 75 can download specific segments of out-of-service data in various formats such as Excel and PDF, enhancing data accessibility and sharing.

In one embodiment, the ASOM application 75 introduces a modern and efficient approach to handle out-of-service aircraft within an airline. By providing multiple views, one-touch filtering, and seamless data integration, the ASOM application 75 streamlines aircraft management processes and enhances user productivity. In some embodiments, the ASOM application 75 provides a significant advancement and improvement in the technical field of airline operation infrastructure and the technical field of flight operations and aircraft management.

In some embodiments, the ASOM application 75 provides an improvement to the technical field of airline operation infrastructure and the technical field of flight operations and aircraft management because: the ASOM application 75 enables users from different stations to submit requests and receive updates and management users can approve or deny these requests, leading to an improvement in airline operations infrastructure; the ASOM application 75 allows for integration of real-time notification through WebSocket to ensure that users are always updated with the latest information on out-of-service aircrafts across the airline; the ASOM application 75 includes a file management system that allows seamless storage and retrieval of aircraft-related data across various cloud platforms; and/or the ASOM application 75 includes the ETR Milestone Tool, which is designed to enhance the accuracy of estimated ETR predictions for out-of-service aircraft.

In one embodiment, an advantage and improvement provided by the ASOM application 75 is the ability to phase out legacy systems. For example, by replacing the intercom system ("PLF") with its Request and Response patterns, the ASOM application 75 helps airlines sunset legacy communication systems, reducing complexity and cost associated with airline operations infrastructure.

In one embodiment, an advantage and improvement provided by the ASOM application 75 is associated with data accessibility and sharing. For example, the ability to download specific segments of out-of-service data provides a technical solution to a problem in the technical field of airline operation infrastructure and the technical field of flight operations and aircraft management.

In one embodiment, an advantage and improvement provided by the ASOM application 75 is robust security. For example, and in some embodiments, the ASOM application 75 prioritizes data security with end-to-end encryption and a comprehensive role management system, safeguarding sensitive aircraft-related information.

In one embodiment, an advantage and improvement provided by the ASOM application 75 is integration and data availability. For example and in some embodiments, the background processors reconcile data with legacy systems, data warehouses, and modern data lake systems, providing real-time data to other airline applications, ensuring data consistency and accessibility.

In one embodiment, an advantage and improvement provided by the ASOM application 75 includes the ETR tool, which provides multiple users, such as mechanics, AMT, crew Chief, and Supervisor with the ability to accurately predict an aircraft's estimated time to return. By improving ETR accuracy, the ASOM application 75 reduces delays and ensures on-time departures.

While the CAMM 80 is illustrated as being tied to the ASOM application 75, it is not limited to the ASOM application 75. In some embodiments, the CAMM 80 can be tied to any number of applications. In some embodiments, the CAMM 80 includes a specific infrastructure configured to support the sharing of media (e.g., photos, videos, and documents) amongst locations and users. As noted previously, when a large number of users are managing a large number of vehicles, which each vehicle being associated with a number of photos, videos, and documents, then storage requirements and accessibility can often be reduced with conventional systems. The CAMM 80, however, with its infrastructure as detailed in FIGS. 22 and 23, solves these problems in that improved and timely visuals of aircraft damage are provided via the CAMM 80 to allow for collaboration and facilitation of the repair process. Another technical improvement associated with the CAMM 80 is that if a system or infrastructure were to go offline, then critical documents and visuals can still be made available. Moreover, the CAMM 80 provides flexibility regarding the ability to move from one platform to another.

In some embodiments, the CAMM 80 provides a technical improvement in the technical field of airline operation infrastructure and the technical field of flight operations and aircraft management because the CAMM 80 seamlessly operates on diverse cloud platforms and utilizes major cloud storage services as its backend for efficient media file management. In some embodiments, the CAMM 80 provides a technical improvement in the technical field of airline operation infrastructure and the technical field of flight operations and aircraft management because the CAMM 80 enables effortless migration of media files from one cloud storage repository to another, as well as facilitating real-time reconciliation and updates of media across multiple cloud platform storage repositories.

In one embodiment, an advantage and improvement provided by the CAMM 80 is that the CAMM 80 is highly adaptable, enabling its execution on any cloud platform without modification. In one embodiment, an advantage and improvement over conventional systems is that CAMM 80 interfaces with major cloud storage services using secure and efficient APIs, establishing a seamless connection between the software and the cloud repositories.

In one embodiment, an advantage and improvement provided by the CAMM 80 is associated with the media migration feature. For example, and in some embodiments, users can initiate migration tasks through a user-friendly interface, specifying the source and destination cloud storage repositories, and the CAMM 80 orchestrates the efficient and secure transfer of media files, maintaining data integrity throughout the migration process.

In one embodiment, an advantage and improvement provided by the CAMM 80 is that the CAMM 80 employs a reconciliation mechanism via the second processor 100*f* to ensure consistent media content across multiple cloud platform storage repositories. In some embodiments, any changes made to media files in one cloud storage repository are detected by the CAMM 80, and updates are automatically propagated to other connected cloud repositories by the CAMM 80. In some embodiments, this process occurs transparently to the end-users and operates seamlessly in the background.

In one embodiment, an advantage and improvement provided by the CAMM 80 is that the CAMM 80 emphasizes robust security measures, encompassing end-to-end encryption during media migration and reconciliation processes. In some embodiments, data integrity checks and error handling mechanisms are employed to mitigate potential data loss and ensure the reliability of the application software.

In one embodiment, an advantage and improvement provided by the CAMM 80 is that CAMM 80 presents solves problems associated with conventional systems and is designed to operate universally across cloud platforms while leveraging major cloud storage services as its backend. With automated media migration capabilities and reconciliation features, the CAMM 80 simplifies media management tasks and enhances data consistency across diverse cloud storage repositories. The CAMM 80 improves, over conventional systems, the way media files are managed in the cloud, providing unparalleled flexibility, security, and efficiency for users seeking a unified media management solution.

In one embodiment, an advantage and improvement provided by the CAMM 80 is that the CAMM 80, unlike existing solutions that often tie users to specific cloud platforms, the CAMM 80 is designed to run on any cloud platform without requiring modifications. In some embodiments, this universal compatibility offers users the freedom to choose their preferred cloud service provider, promoting vendor neutrality and flexibility.

In one embodiment, an advantage and improvement provided by the CAMM 80 is that CAMM 80 leverages various major cloud storage services as its backend, allowing users to manage media files across multiple cloud repositories thereby enabling seamless integration with established cloud providers, eliminating the need for separate data silos.

In one embodiment, an advantage and improvement provided by the CAMM 80 is that CAMM 80 introduces an automated media migration feature, streamlining the process of transferring media files from one cloud storage repository to another.

In one embodiment, an advantage and improvement provided by the CAMM 80 is that CAMM 80, unlike traditional synchronization methods that may have delays, ensures data consistency in near real-time.

In one embodiment, an advantage and improvement provided by the CAMM 80 is that CAMM 80 is applicable across various industries, both within and outside the cloud computing domain. For example, and within the cloud computing industry, the CAMM 80 is applicable to cloud services providers and cloud-based applications. For example, and outside of the cloud computing domain, the CAMM 80 is applicable to enterprises with media management needs. For example, the CAMM 80 is applicable to enterprises across various sectors, including entertainment, marketing, and e-commerce, which heavily rely on media assets. The CAMM 80 provides a scalable, secure, and versatile media management solution across different cloud platforms. The CAMM 80, in some embodiments, is also applicable to cross-platform application developers because the CAMM 80 is capable of providing end-users with a seamless and consistent media handling experience for developers creating applications that require media management across multiple cloud storage services.

In an example embodiment, the network 90 includes the Internet, one or more local area networks, one or more wide area networks, one or more cellular networks, one or more wireless networks, one or more voice networks, one or more data networks, one or more communication systems, and/or any combination thereof. In some embodiments, the network 90 also includes WIFI, Bluetooth, and Long-Term Evolution ("LTE") or other wireless broadband communication technology.

In an example embodiment, the cloud system 100, the cloud system 110, and/or the cloud system 120 include a cloud platform and cloud storage services. In some embodiments, each of the cloud systems 100, 110, and 120 has a different cloud computing service model. As such, the cloud systems 100, 110, and 120 comprise diverse cloud systems.

Figure 25:
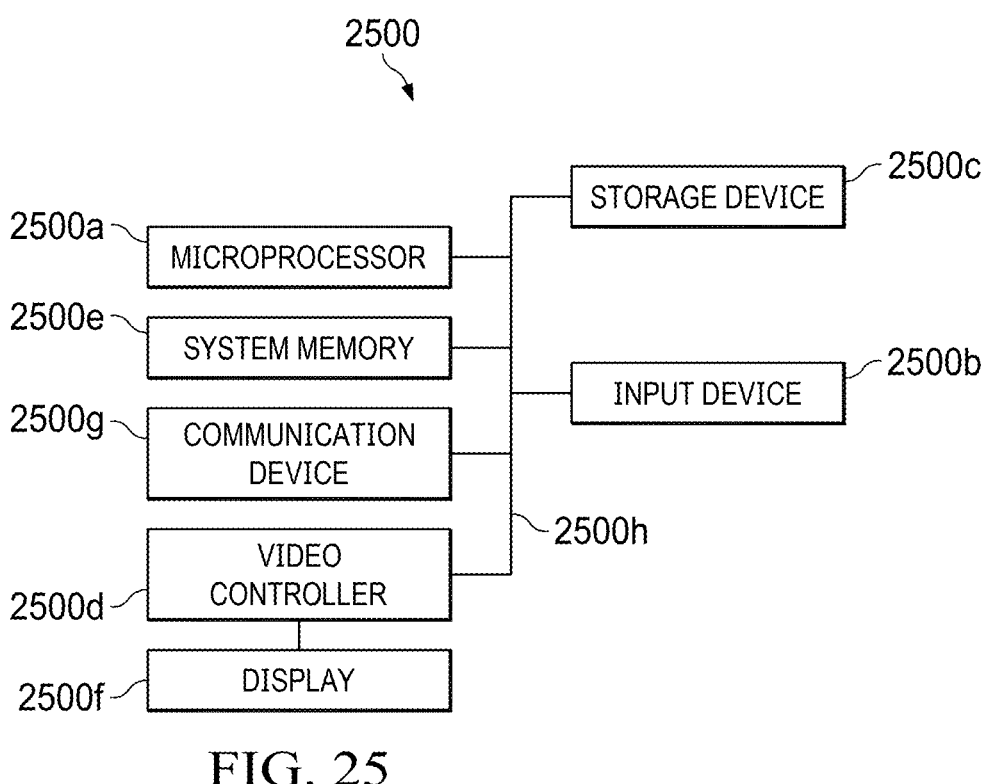
FIG. 25 is a diagrammatic illustration of a computing device for implementing one or more example embodiments of the present disclosure, according to an example embodiment.

In an example embodiment, as illustrated in FIG. 25 with continuing reference to FIGS. 1-24, an illustrative node 2500 for implementing one or more of the example embodiments described above and/or illustrated in FIGS. 1-24 is depicted. The node 2500 includes a microprocessor 2500a, an input device 2500b, a storage device 2500c, a video controller 2500d, a system memory 2500e, a display 2500f, and a communication device 2500g, all interconnected by one or more buses 2500h. In several example embodiments, the storage device 2500c may include a hard drive, CD-ROM, optical drive, any other form of storage device and/or any combination thereof. In several example embodiments, the storage device 2500c may include, and/or be capable of receiving, a floppy disk, CD-ROM, DVD-ROM, or any other form of computer-readable medium that may contain executable instructions. In several example embodiments, the communication device 2500g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones, and cell phones.

In several example embodiments, one or more of the components of the systems described above and/or illustrated in FIGS. 1-24 include at least the node 2500 and/or components thereof, and/or one or more nodes that are substantially similar to the node 2500 and/or components thereof. In several example embodiments, one or more of the above-described components of the node 2500, the system 10, and/or the example embodiments described above and/or illustrated in FIGS. 1-24 include respective pluralities of same components.

In several example embodiments, one or more of the applications, systems, and application programs described above and/or illustrated in FIGS. 1-24 include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as on "the cloud," for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices, and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, instructions are stored on a non-transitory computer readable medium and executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 2500*a*, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

It is understood that variations may be made in the foregoing without departing from the scope of the present disclosure. For example, instead of, or in addition to, vehicles being monitored in the airline industry business, aspects of the present disclosure are applicable and/or readily adaptable to vehicles being monitored in other industries, including rail, bus, cruise and other travel or shipping industries, rental car industries, hotels and other hospitality industries, entertainment industries, and other industries. Moreover, the infrastructure described herein is not limited to being tied to an application that monitored vehicles.

The present disclosure introduces a method of interacting with a plurality of cloud systems using a first cloud system comprising a database, a first processor, a second processor, a first infrequent access media storage, a first frequent access media storage, and an application programming interface ("API") configured to interact with a user and with a second cloud system and a third cloud system of the plurality of cloud systems, the method comprising: receiving, by the API, a user instruction; wherein the user instruction is an upload media command, a download media command, a get list command, or a delete media command; accessing, in the database and based on the user instruction, metadata for a first media file; wherein the metadata for the first media file is used to determine a storage connector setting associated with the first media file; wherein the storage connector setting is either an infrequent access identifier or a frequent access identifier; wherein the third cloud system is a replication of the second cloud system; wherein the second cloud system comprises a second infrequent access storage and a second frequent access storage; and wherein the third cloud system comprises a third infrequent access storage and a third frequent access storage; accessing, by the first processor and when the storage connector setting is the infrequent access identifier, the first infrequent access storage to implement the user instruction; accessing, by the first processor and when the storage connector setting is the frequent access identifier, the first frequent access storage to implement the user instruction; monitoring, by the second processor, a change to the media in one of the first cloud system, the second cloud system, and third second cloud system; and implementing, by the second processor, the change to the media in the two others of the first cloud system, the second cloud system, and the third cloud system, thereby syncing the media in the first cloud system, the second cloud system, and the third could system to perform real-time reconciliation across the first cloud system, the second cloud system, and the third cloud system. In some embodiments, the user instruction is the upload command to upload the first media file; wherein the user instruction further comprise a source identifier associated with the first media file and a destination cloud storage for the first media file; wherein the destination cloud storage is the second cloud system or the third cloud system; wherein the metadata for the first media file comprises an upload date; wherein the upload date is used to determine that the storage connector setting associated with the first media file is the frequent access identifier; wherein accessing, by the first processor and when the storage connector setting is the frequent access identifier, the first frequent access storage comprises uploading the first media in the first frequent access storage thereby implementing the user instruction; wherein monitoring, by the second processor, the change to the media in one of the first cloud system, first cloud system, and the second cloud system comprises monitoring the upload of the first media in the first cloud system; and wherein implementing, by the second processor, the change to the media in the two others of the first cloud system, the second cloud system, and the third cloud system comprises uploading the first media in the second frequent access storage of the second cloud system and/or the third frequent access storage of the third cloud system. In some embodiments the user instruction is the download command to download the first media file; wherein the method further comprises: determining, by the first processor, that the storage connector setting for the first media file is the infrequent access identifier; getting, by the API and from the database, the storage connector settings associated with the first media file; wherein accessing, by the first processor and when the storage connector setting is the infrequent access identifier, the first infrequent access storage comprises retrieving the first media in the first infrequent access storage thereby implementing the user instruction; and providing, by the API and to the user via the user interface, the first media file for download. In some embodiments, the user instruction is the get list command to get a first list; wherein the first list is associated with a plurality of media files; wherein the plurality of media files comprises the first media file; wherein the method further comprises: accessing, in the database and based on the user instruction, metadata for each media file in the plurality of media files; creating a listing that includes, for each media file in the plurality of media files, at least a portion of the metadata for each media file in the plurality of media files; and providing, by the API and to the user via the user interface, the listing thereby implementing the user instruction. In some embodiments, the user instruction is the delete command to delete the first media file; wherein accessing, by the first processor and when the storage connector setting is the infrequent access identifier, the first infrequent access storage to delete the first media file; wherein accessing, by the first processor and when the storage connector setting is the frequent access identifier, the first frequent access storage to delete the first media file; wherein the change to the media in the one of the first cloud system, the second cloud system, and the third cloud system is the deletion of the first media file from the first cloud system; and wherein implementing, by the second processor, the change to the media in the two others of the first cloud system, the second cloud system, and the third cloud system comprises deleting the first media file from the second cloud system and the third cloud system. In some embodiments, the method also includes changing, by the first processor and based on metadata associated with the first media file, the storage connector setting from the frequent access identifier to the infrequent access identifier. In some embodiments, the method also includes automatically migrating, by the first processor, the first media file to the first infrequent access storage and purging the first media file from the first frequent accessed storage. In some embodiments, the metadata comprises a timestamp associated with the first media file. In some embodiments, the timestamp is associated with modification or creation of the first media file. In some embodiments, the second cloud storage system has a cloud computing service model that is different from a cloud computer service model of the first cloud storage system. In some embodiments, the method also includes replicating, by the second processor, the media in the second cloud system and the third cloud system to a fourth cloud system having a cloud computer service model that is different from the cloud computer service model of the second cloud storage system.

The present disclosure introduces a system for interacting with a plurality of cloud systems using a first cloud system comprising a database, a first processor, a second processor, a first infrequent access media storage, a first frequent access media storage, and an application programming interface ("API") configured to interact with a user and with a second cloud system and a third cloud system of the plurality of cloud systems, the system comprising a non-transitory computer readable medium having stored thereon a plurality of instructions, wherein the instructions are executed with one or more processors so that the following steps are executed: receiving, by the API, a user instruction; wherein the user instruction is an upload media command, a download media command, a get list command, or a delete media command; accessing, in the database and based on the user instruction, metadata for a first media file; wherein the metadata for the first media file is used to determine a storage connector setting associated with the first media file; wherein the storage connector setting is either an infrequent access identifier or a frequent access identifier; wherein the third cloud system is a replication of the second cloud system; wherein the second cloud system comprises a second infrequent access storage and a second frequent access storage; and wherein the third cloud system comprises a third infrequent access storage and a third frequent access storage; accessing, by the first processor and when the storage connector setting is the infrequent access identifier, the first infrequent access storage to implement the user instruction; accessing, by the first processor and when the storage connector setting is the frequent access identifier, the first frequent access storage to implement the user instruction; monitoring, by the second processor, a change to the media in one of the first cloud system, the second cloud system, and third second cloud system; and implementing, by the second processor, the change to the media in the two others of the first cloud system, the second cloud system, and the third cloud system, thereby syncing the media in the first cloud system, the second cloud system, and the third could system to perform real-time reconciliation across the first cloud system, the second cloud system, and the third cloud system. In some embodiments, the user instruction is the upload command to upload the first media file; wherein the user instruction further comprise a source identifier associated with the first media file and a destination cloud storage for the first media file; wherein the destination cloud storage is the second cloud system or the third cloud system; wherein the metadata for the first media file comprises an upload date; wherein the upload date is used to determine that the storage connector setting associated with the first media file is the frequent access identifier; wherein accessing, by the first processor and when the storage connector setting is the frequent access identifier, the first frequent access storage comprises uploading the first media in the first frequent access storage thereby implementing the user instruction; wherein monitoring, by the second processor, the change to the media in one of the first cloud system, first cloud system, and the second cloud system comprises monitoring the upload of the first media in the first cloud system; and wherein implementing, by the second processor, the change to the media in the two others of the first cloud system, the second cloud system, and the third cloud system comprises uploading the first media in the second frequent access storage of the second cloud system and/or the third frequent access storage of the third cloud system. In some embodiments, the user instruction is the download command to download the first media file; wherein the instructions are executed with one or more processors so that the following steps are also executed: determining, by the first processor, that the storage connector setting for the first media file is the infrequent access identifier; getting, by the API and from the database, the storage connector settings associated with the first media file; wherein accessing, by the first processor and when the storage connector setting is the infrequent access identifier, the first infrequent access storage comprises retrieving the first media in the first infrequent access storage thereby implementing the user instruction; and providing, by the API and to the user via the user interface, the first media file for download. In some embodiments, the user instruction is the get list command to get a first list; wherein the first list is associated with a plurality of media files; wherein the plurality of media files comprises the first media file; wherein the instructions are executed with one or more processors so that the following steps are also executed: accessing, in the database and based on the user instruction, metadata for each media file in the plurality of media files;

creating a listing that includes, for each media file in the plurality of media files, at least a portion of the metadata for each media file in the plurality of media files; and providing, by the API and to the user via the user interface, the listing thereby implementing the user instruction. In some embodiments, the user instruction is the delete command to delete the first media file; wherein accessing, by the first processor and when the storage connector setting is the infrequent access identifier, the first infrequent access storage to delete the first media file; wherein accessing, by the first processor and when the storage connector setting is the frequent access identifier, the first frequent access storage to delete the first media file; wherein the change to the media in the one of the first cloud system, the second cloud system, and the third cloud system is the deletion of the first media file from the first cloud system; and wherein implementing, by the second processor, the change to the media in the two others of the first cloud system, the second cloud system, and the third cloud system comprises deleting the first media file from the second cloud system and the third cloud system. In some embodiments, the instructions are executed with one or more processors so that the following step is also executed: changing, by the first processor and based on metadata associated with the first media file, the storage connector setting from the frequent access identifier to the infrequent access identifier. In some embodiments, the instructions are executed with one or more processors so that the following step is also executed: automatically migrating, by the first processor, the first media file to the first infrequent access storage and purging the first media file from the first frequent accessed storage. In some embodiments, the metadata comprises a timestamp associated with the first media file. In some embodiments, the timestamp is associated with modification or creation of the first media file. In some embodiments, the second cloud storage system has a cloud computing service model that is different from a cloud computer service model of the first cloud storage system. In some embodiments, the instructions are executed with one or more processors so that the following step is also executed: replicating, by the second processor, the media in the second cloud system and the third cloud system to a fourth cloud system having a cloud computer service model that is different from the cloud computer service model of the second cloud storage system.

It is understood that variations may be made in the foregoing without departing from the scope of the present disclosure. For example, instead of, or in addition to the management of out-of-service aircraft, aspects of the present disclosure are applicable and/or readily adaptable to vehicle and/or equipment management conducted in other industries, including rail, bus, cruise and other travel or shipping industries, rental car industries, hotels and other hospitality industries, entertainment industries, and other industries.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down,"

etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A; B; or both A and B." The phrase "one or more of the following: A, B, and C" should be understood to mean "A; B; C; A and B; B and C; A and C; or all three of A, B, and C." The phrase "one or more of A, B, and C" should be understood to mean "A; B; C; A and B; B and C; A and C; or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method of interacting with a plurality of cloud systems using a first cloud system comprising a database, a first processor, a second processor, a first infrequent access storage, a first frequent access storage, and an application programming interface ("API") configured to interact with a user and with a second cloud system and a third cloud system of the plurality of cloud systems, the method comprising:

receiving, by the API, a user instruction;
    wherein the user instruction is an upload media command, a download media command, a get list command, or a delete media command;
accessing, in the database and based on the user instruction, metadata for a first media file;
    wherein the metadata for the first media file is used to determine a storage connector setting associated with the first media file;
    wherein the storage connector setting is either an infrequent access identifier or a frequent access identifier;
    wherein the third cloud system is a replication of the second cloud system;

wherein the second cloud system comprises a second infrequent access storage and a second frequent access storage; and wherein the third cloud system comprises a third infrequent access storage and a third frequent access storage;

accessing, by the first processor and when the storage connector setting is the infrequent access identifier, the first infrequent access storage to implement the user instruction;

accessing, by the first processor and when the storage connector setting is the frequent access identifier, the first frequent access storage to implement the user instruction;

monitoring, by the second processor, a change to the media in one of the first cloud system, the second cloud system, and third second cloud system; and implementing, by the second processor, the change to the media in the two others of the first cloud system, the second cloud system, and the third cloud system, thereby syncing the media in the first cloud system, the second cloud system, and the third cloud system to perform real-time reconciliation across the first cloud system, the second cloud system, and the third cloud system.

2. The method of claim 1, wherein the user instruction is the upload media command to upload the first media file;

wherein the user instruction further comprise a source identifier associated with the first media file and a destination cloud storage for the first media file;

wherein the destination cloud storage is the second cloud system or the third cloud system;

wherein the metadata for the first media file comprises an upload date;

wherein the upload date is used to determine that the storage connector setting associated with the first media file is the frequent access identifier;

wherein accessing, by the first processor and when the storage connector setting is the frequent access identifier, the first frequent access storage comprises uploading the first media in the first frequent access storage thereby implementing the user instruction;

wherein monitoring, by the first processor, the change to the media in one of the first cloud system, first cloud system, and the second cloud system comprises monitoring the upload of the first media in the first cloud system; and wherein implementing, by the second processor, the change to the media in the two others of the first cloud system, the second cloud system, and the third cloud system comprises uploading the first media in the second frequent access storage of the second cloud system and/or the third frequent access storage of the third cloud system.

3. The method of claim 1, wherein the user instruction is the download media command to download the first media file;

wherein the method further comprises:

determining, by the first processor, that the storage connector setting for the first media file is the infrequent access identifier;

getting, by the API and from the database, the storage connector settings associated with the first media file;

wherein accessing, by the first processor and when the storage connector setting is the infrequent access identifier, the first infrequent access storage comprises retrieving the first media in the first infrequent access storage thereby implementing the user instruction;

and providing, by the API and to the user via a user interface, the first media file for download.

4. The method of claim 1, wherein the user instruction is the get list command to get a first list;

wherein the first list is associated with a plurality of media files;

wherein the plurality of media files comprises the first media file;

wherein the method further comprises:

accessing, in the database and based on the user instruction, metadata for each media file in the plurality of media files;

creating a listing that includes, for each media file in the plurality of media files, at least a portion of the metadata for each media file in the plurality of media files; and providing, by the API and to the user via a user interface, the listing thereby implementing the user instruction.

5. The method of claim 1, wherein the user instruction is the delete media command to delete the first media file;

wherein accessing, by the first processor and when the storage connector setting is the infrequent access identifier, the first infrequent access storage to delete the first media file;

wherein accessing, by the first processor and when the storage connector setting is the frequent access identifier, the first frequent access storage to delete the first media file;

wherein the change to the media in the one of the first cloud system, the second cloud system, and the third cloud system is the deletion of the first media file from the first cloud system; and wherein implementing, by the second processor, the change to the media in the two others of the first cloud system, the second cloud system, and the third cloud system comprises deleting the first media file from the second cloud system and the third cloud system.

6. The method of claim 1, further comprising changing, by the first processor and based on metadata associated with the first media file, the storage connector setting from the frequent access identifier to the infrequent access identifier.

7. The method of claim 6, further comprising automatically migrating, by the first processor, the first media file to the first infrequent access storage and purging the first media file from the first frequent access storage.

8. The method of claim 7, wherein the metadata comprises a timestamp associated with the first media file.

9. The method of claim 8, wherein the timestamp is associated with modification or creation of the first media file.

10. The method of claim 1, wherein the second cloud system has a cloud computing service model that is different from a cloud computer service model of the first cloud system.

11. The method of claim 10, further comprising replicating, by the second processor, the media in the second cloud system and the third cloud system to a fourth cloud system having a cloud computer service model that is different from the cloud computer service model of the second cloud system.

12. A system for interacting with a plurality of cloud systems using a first cloud system comprising a database, a first processor, a second processor, a first infrequent access storage, a first frequent access storage, and an application programming interface ("API") configured to interact with a user and with a second cloud system and a third cloud system of the plurality of cloud systems, the system comprising a non-transitory computer readable medium having stored thereon a plurality of instructions, wherein the instructions are executed with one or more processors so that the following steps are executed:

receiving, by the API, a user instruction;
   wherein the user instruction is an upload media command, a download media command, a get list command, or a delete media command;
   accessing, in the database and based on the user instruction, metadata for a first media file;
   wherein the metadata for the first media file is used to determine a storage connector setting associated with the first media file;
   wherein the storage connector setting is either an infrequent access identifier or a frequent access identifier;
   wherein the third cloud system is a replication of the second cloud system;
   wherein the second cloud system comprises a second infrequent access storage and a second frequent access storage; and
   wherein the third cloud system comprises a third infrequent access storage and a third frequent access storage;
   accessing, by the first processor and when the storage connector setting is the infrequent access identifier, the first infrequent access storage to implement the user instruction;
   accessing, by the first processor and when the storage connector setting is the frequent access identifier, the first frequent access storage to implement the user instruction;
   monitoring, by the second processor, a change to the media in one of the first cloud system, the second cloud system, and third second cloud system; and
   implementing, by the second processor, the change to the media in the two others of the first cloud system, the second cloud system, and the third cloud system, thereby syncing the media in the first cloud system, the second cloud system, and the third cloud system to perform real-time reconciliation across the first cloud system, the second cloud system, and the third cloud system.

13. The system of claim 12,
   wherein the user instruction is the upload media command to upload the first media file;
   wherein the user instruction further comprise a source identifier associated with the first media file and a destination cloud storage for the first media file;
   wherein the destination cloud storage is the second cloud system or the third cloud system;
   wherein the metadata for the first media file comprises an upload date;
   wherein the upload date is used to determine that the storage connector setting associated with the first media file is the frequent access identifier;

wherein accessing, by the first processor and when the storage connector setting is the frequent access identifier, the first frequent access storage comprises uploading the first media in the first frequent access storage thereby implementing the user instruction;
   wherein monitoring, by the second processor, the change to the media in one of the first cloud system, first cloud system, and the second cloud system comprises monitoring the upload of the first media in the first cloud system; and
   wherein implementing, by the second processor, the change to the media in the two others of the first cloud system, the second cloud system, and the third cloud system comprises uploading the first media in the second frequent access storage of the second cloud system and/or the third frequent access storage of the third cloud system.

14. The system of claim 12,
   wherein the user instruction is the download media command to download the first media file;
   wherein the instructions are executed with one or more processors so that the following steps are also executed:
      determining, by the first processor, that the storage connector setting for the first media file is the infrequent access identifier;
      getting, by the API and from the database, the storage connector settings associated with the first media file;
      wherein accessing, by the first processor and when the storage connector setting is the infrequent access identifier, the first infrequent access storage comprises retrieving the first media in the first infrequent access storage thereby implementing the user instruction;
      and
      providing, by the API and to the user via a user interface, the first media file for download.

15. The system of claim 12,
   wherein the user instruction is the get list command to get a first list;
   wherein the first list is associated with a plurality of media files;
   wherein the plurality of media files comprises the first media file;
   wherein the instructions are executed with one or more processors so that the following steps are also executed:
      accessing, in the database and based on the user instruction, metadata for each media file in the plurality of media files;
      creating a listing that includes, for each media file in the plurality of media files, at least a portion of the metadata for each media file in the plurality of media files; and
      providing, by the API and to the user via a user interface, the listing thereby implementing the user instruction.

16. The system of claim 12,
   wherein the user instruction is the delete media command to delete the first media file;
   wherein accessing, by the first processor and when the storage connector setting is the infrequent access identifier, the first infrequent access storage to delete the first media file;
   wherein accessing, by the first processor and when the storage connector setting is the frequent access identifier, the first frequent access storage to delete the first media file;

wherein the change to the media in the one of the first cloud system, the second cloud system, and the third cloud system is the deletion of the first media file from the first cloud system; and wherein implementing, by the second processor, the change to the media in the two others of the first cloud system, the second cloud system, and the third cloud system comprises deleting the first media file from the second cloud system and the third cloud system.

17. The system of claim 12, wherein the instructions are executed with one or more processors so that the following step is also executed:

changing, by the first processor and based on metadata associated with the first media file, the storage connector setting from the frequent access identifier to the infrequent access identifier.

18. The system of claim 17, wherein the instructions are executed with one or more processors so that the following step is also executed:

automatically migrating, by the first processor, the first media file to the first infrequent access storage and purging the first media file from the first frequent access storage.

19. The system of claim 18, wherein the metadata comprises a timestamp associated with the first media file.

20. The system of claim 19, wherein the timestamp is associated with modification or creation of the first media file.

21. The system of claim 12, wherein the second cloud system has a cloud computing service model that is different from a cloud computer service model of the first cloud system.

22. The system of claim 21, wherein the instructions are executed with one or more processors so that the following step is also executed:

replicating, by the second processor, the media in the second cloud system and the third cloud system to a fourth cloud system having a cloud computer service model that is different from the cloud computer service model of the second cloud system.

* * * * *